US010613333B2

(12) United States Patent
Yajima

(10) Patent No.: US 10,613,333 B2
(45) Date of Patent: Apr. 7, 2020

(54) HEAD-MOUNTED DISPLAY DEVICE, COMPUTER PROGRAM, AND CONTROL METHOD FOR HEAD-MOUNTED DISPLAY DEVICE

(71) Applicant: SEIKO EPSON CORPORATION, Tokyo (JP)

(72) Inventor: Kenro Yajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 15/902,533

(22) Filed: Feb. 22, 2018

(65) Prior Publication Data
US 2018/0246334 A1 Aug. 30, 2018

(30) Foreign Application Priority Data

Feb. 28, 2017 (JP) .................. 2017-035982

(51) Int. Cl.
G02B 27/01 (2006.01)
G06F 3/14 (2006.01)
G06F 3/01 (2006.01)
H04N 13/332 (2018.01)

(52) U.S. Cl.
CPC ......... *G02B 27/0172* (2013.01); *G06F 3/012* (2013.01); *G06F 3/14* (2013.01); *G02B 2027/0118* (2013.01); *G02B 2027/0178* (2013.01); *H04N 13/332* (2018.05)

(58) Field of Classification Search
CPC .............................. G06F 3/011–015
See application file for complete search history.

(56) References Cited

U.S. PATENT DOCUMENTS

| 8,411,907 | B2* | 4/2013 | Nelson .................... G06F 3/005 250/206 |
| 8,818,498 | B2* | 8/2014 | Terada ................. A61B 5/0478 600/383 |
| 9,423,872 | B2* | 8/2016 | Kim ......................... G06T 11/00 |
| 9,437,159 | B2* | 9/2016 | Moravetz ............... G09G 5/006 |
| 9,599,825 | B1* | 3/2017 | Mullins .............. G02B 27/0179 |
| 9,678,344 | B2 | 6/2017 | Takeda et al. |
| 9,965,030 | B2* | 5/2018 | Jeong ...................... G06F 3/013 |
| 10,096,167 | B2* | 10/2018 | Moravetz ............... G09G 5/006 |
| 10,152,869 | B2* | 12/2018 | Peyrard ................... G06F 3/013 |

(Continued)

FOREIGN PATENT DOCUMENTS

JP  5919899 B2  5/2016
JP  2016-122177 A  7/2016
(Continued)

*Primary Examiner* — Patrick F Marinelli
(74) *Attorney, Agent, or Firm* — Oliff PLC

(57) ABSTRACT

A head-mounted display device includes an image display section worn on the head of a user and configured to be capable of transmitting external light and display an image, a right electronic shade and a left electronic shade configured to adjust transmittance of the external light transmitted through the image display section, and a control section configured to determine a worn state of the image display section on the head of the user, control the right electronic shade and the left electronic shade on the basis of a result of the determination, and adjust the transmittance of the external light transmitted through the image display section.

7 Claims, 13 Drawing Sheets

(56) References Cited

U.S. PATENT DOCUMENTS

| | | | |
|---|---|---|---|
| 2011/0071416 A1* | 3/2011 | Terada | A61B 5/0478 600/544 |
| 2011/0305375 A1* | 12/2011 | Nelson | G06F 3/005 382/118 |
| 2011/0316763 A1* | 12/2011 | Yada | G02B 27/017 345/8 |
| 2013/0069787 A1* | 3/2013 | Petrou | G02B 27/017 340/573.1 |
| 2013/0147859 A1* | 6/2013 | Kobayashi | G09G 5/10 345/690 |
| 2013/0235169 A1* | 9/2013 | Kato | G02B 27/01 348/53 |
| 2014/0035808 A1* | 2/2014 | Lee | G06F 3/14 345/156 |
| 2014/0228652 A1* | 8/2014 | Terada | A61B 5/0478 600/301 |
| 2015/0213778 A1* | 7/2015 | Moravetz | G09G 5/006 345/520 |
| 2016/0034032 A1* | 2/2016 | Jeong | G06F 3/013 345/156 |
| 2016/0049012 A1* | 2/2016 | Torii | G06T 19/006 345/633 |
| 2016/0140767 A1* | 5/2016 | Kobayashi | G06T 19/006 345/633 |
| 2016/0157778 A1* | 6/2016 | Terada | A61B 5/0478 600/301 |
| 2016/0187662 A1* | 6/2016 | Sato | G02B 27/017 345/8 |
| 2017/0090203 A1* | 3/2017 | Mullins | G02B 27/0179 |
| 2017/0215753 A1* | 8/2017 | Lee | A61B 5/04001 |
| 2017/0276943 A1* | 9/2017 | Osman | G06F 3/167 |
| 2017/0277254 A1* | 9/2017 | Osman | G06F 3/167 |
| 2017/0315938 A1* | 11/2017 | Mori | G06F 9/445 |
| 2018/0003983 A1* | 1/2018 | Sako | G02B 27/0172 |
| 2018/0082483 A1* | 3/2018 | Moravetz | G09G 5/006 |
| 2018/0082656 A1* | 3/2018 | Ito | G02B 27/02 |
| 2018/0122208 A1* | 5/2018 | Peyrard | G06F 3/013 |
| 2018/0246334 A1* | 8/2018 | Yajima | G02B 27/0172 |
| 2018/0348861 A1* | 12/2018 | Uscinski | G06F 3/013 |
| 2018/0356884 A1* | 12/2018 | Lee | G06F 3/012 |
| 2019/0005679 A1* | 1/2019 | Nie | G06T 7/74 |

FOREIGN PATENT DOCUMENTS

| | | |
|---|---|---|
| JP | 5960799 B2 | 8/2016 |
| WO | 2013/145147 A1 | 10/2013 |

\* cited by examiner

HEAD-MOUNTED DISPLAY DEVICE, COMPUTER PROGRAM, AND CONTROL METHOD FOR HEAD-MOUNTED DISPLAY DEVICE

BACKGROUND

1. Technical Field

The present invention relates to a head-mounted display device, a computer program, and a control method for the head-mounted display device.

2. Related Art

There has been known a head-mounted display device including a display section, which displays an image, and mounted on the head of a user and used (see, for example, JP-A-2013-186292 (Patent Literature 1)). The head-mounted display device is called HMD (Head Mounted Display). The HMD can enable the user wearing the HMD on the head to visually recognize an image. The HMD guides image light output by the display section to the eyes of the user to thereby cause the user to visually recognize the image. Therefore, unless the HMD is correctly mounted, the user sometimes cannot visually recognize an image that the user can originally visually recognize.

A virtual image display device disclosed in Patent Literature 1 includes a member for positioning that displays a marker functioning as an indicator of positioning and a positioning mechanism that moves the position of the member for positioning attached to an optical system of a virtual-image forming section and adjusts the position of the virtual-image forming section with respect to the eyes of a wearer. In a state in which the wearer wears the virtual-image display device, the wearer of the virtual image display device confirms the positions and the like of the eyes of the wearer from an outside world image, in which the figure of the wearer reflected on a mirror is shown, and moves the virtual-image forming section to adjust the position of the virtual-image forming section using the positioning mechanism. When the adjustment of the position is completed, the wearer detaches the member for positioning from the optical system of the virtual-image forming section.

However, in the virtual image display device disclosed in Patent Literature 1, the mirror for reflecting the figure of the wearer has to be prepared besides the virtual image display device. Further, work for detaching the member for positioning from the optical system of the virtual-image forming section after the adjustment of the position is necessary.

SUMMARY

An advantage of some aspects of the invention is to easily perform adjustment of a worn state of a head-mounted display device.

An aspect of the invention is directed to a head-mounted display device including: a display section worn on a head of a user and configured to be capable of transmitting external light and display an image; a transmittance adjusting section configured to adjust transmittance of the external light transmitted through the display section; and a control section configured to determine a worn state of the display section on the head of the user, control the transmittance adjusting section on the basis of a result of the determination, and adjust the transmittance of the external light transmitted through the display section.

According to the aspect of the invention, the transmittance of the external light is adjusted on the basis of the determination result of the worn state of the display section. Therefore, it is possible to indicate the worn state of the display section with the transmittance of the external light. Therefore, it is unnecessary to prepare a mirror for reflecting the worn state of the display section in order to adjust the worn state of the display section. It is possible to easily adjust the worn state.

In the head-mounted display device according to the aspect of the invention, the display section may include a display region where the image is displayed, the transmittance adjusting section may include a transmittance adjustment plate superimposed and disposed on the display section including the display region, and the control section may set, on the basis of the determination result of the worn state of the display section, a region of the transmittance adjustment plate for adjusting the transmittance of the external light and adjust the transmittance of the external light in the set region.

According to the aspect of the invention with this configuration, the region of the transmittance adjustment plate for adjusting the transmittance of the external light is set on the basis of the determination result of the worn state of the display section with respect to the head of the user. The transmittance of the external light in the set region is adjusted by the transmittance adjusting section. Therefore, it is possible to adjust the transmittance of the external light in the region of the transmittance adjustment plate corresponding to the determination result of the worn state of the display section. Therefore, it is possible to show the determination result of the worn state of the display section to the user.

In the head-mounted display device according to the aspect of the invention, the transmittance adjustment plate may be divided into a plurality of regions, transmittance of visible light being able to be set for each of the regions, and the control section may determine a deviating direction of a worn position of the display section on the head of the user and adjust transmittance of a region of the transmittance adjustment plate corresponding to the determined deviating direction.

According to the aspect of the invention with this configuration, the deviating direction of the worn position of the display section on the head of the user is determined and the transmittance of the region corresponding to the determined deviating direction is adjusted. Therefore, it is possible to notify the deviating direction of the worn position of the display section to the user.

In the head-mounted display device according to the aspect of the invention, the transmittance adjustment plate may be divided into a plurality of regions, transmittance of visible light being able to be set for each of the regions, and the control section may determine a deviating direction of a worn position of the display section on the head of the user and adjust transmittance of a region of the transmittance adjustment plate corresponding to a direction opposite to the determined deviating direction.

According to the aspect of the invention with this configuration, the deviating direction of the worn position of the display section on the head of the user is determined and the transmittance of the region corresponding to the direction opposite to the determined deviating direction is adjusted. It is possible to improve visibility of the image displayed by the display section by adjusting the transmittance of the external light. That is, the visibility of the image displayed by the display section is improved by adjusting the worn state of the display section in the direction in which the transmittance of the external light is adjusted. Therefore, the user can adjust the deviation of the worn state of the display section by adjusting the worn state of the display section in a direction in which the visibility of the image displayed by the display section is improved.

In the head-mounted display device according to the aspect of the invention, the control section may display a display object on the transmittance adjustment plate by setting transmittances of the visible light in the plurality of regions of the transmittance adjustment plate, and the display object may be displayed in a direction in which the display object can be recognized from an outer side of the display section.

According to the aspect of the invention with this configuration, it is possible to cause the transmittance adjustment plate to display the display object displayed in the direction in which the display object can be recognized from the outer side of the display section.

In the head-mounted display device according to the aspect of the invention, the display object may include information concerning the worn state of the display section.

According to the aspect of the invention with this configuration, it is possible to cause the transmittance adjustment plate to display the display object including the information concerning the worn state of the display section.

In the head-mounted display device according to the aspect of the invention, the display object may include information concerning an operation state of the head-mounted display device.

According to the aspect of the invention with this configuration, it is possible to cause the transmittance adjustment plate to display the display object including the information concerning the operation state of the head-mounted display device.

In the head-mounted display device according to the aspect of the invention, the head-mounted display device may further include a notifying section, and, when a deviation amount of the worn state of the display section on the head of the user is within a preset range, the control section may adjust the transmittance of the external light with the transmittance adjusting section and, when the deviation amount of the worn state of the display section on the head of the user is larger than the range, the control section may perform notification by the notifying section.

According to the aspect of the invention with this configuration, when the deviation amount of the worn state of the display section on the head of the user is larger than the preset range, it is possible to perform the notification by the notifying section.

Another aspect of the invention is directed to a computer program executed by a computer mounted on a head-mounted display device including a display section worn on a head of a user and configured to be capable of transmitting external light and display an image and a transmittance adjusting section configured to adjust transmittance of the external light transmitted through the display section, the computer program causing the computer to execute: a determination procedure for determining a worn state of the display section on the head of the user; and an adjustment procedure for controlling the transmittance adjusting section on the basis of a result of the determination in the determination procedure and adjusting the transmittance of the external light transmitted through the display section.

According to the aspect of the invention, the transmittance of the external light is adjusted on the basis of the determination result of the worn state of the display section. Therefore, it is possible to indicate the worn state of the display section with the transmittance of the external light. Therefore, it is unnecessary to prepare a mirror for reflecting the worn state of the display section in order to adjust the worn state of the display section. It is possible to easily adjust the worn state.

Still another aspect of the invention is directed to a control method for a head-mounted display device including a display section worn on a head of a user and configured to be capable of transmitting external light and display an image and a transmittance adjusting section configured to adjust transmittance of the external light transmitted through the display section, the control method including: determining a worn state of the display section on the head of the user; and controlling the transmittance adjusting section on the basis of a result of the determination and adjusting the transmittance of the external light transmitted through the display section.

According to the aspect of the invention, the transmittance of the external light is adjusted on the basis of the determination result of the worn state of the display section. Therefore, it is possible to indicate the worn state of the display section with the transmittance of the external light. Therefore, it is unnecessary to prepare a mirror for reflecting the worn state of the display section in order to adjust the worn state of the display section. It is possible to easily adjust the worn state.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
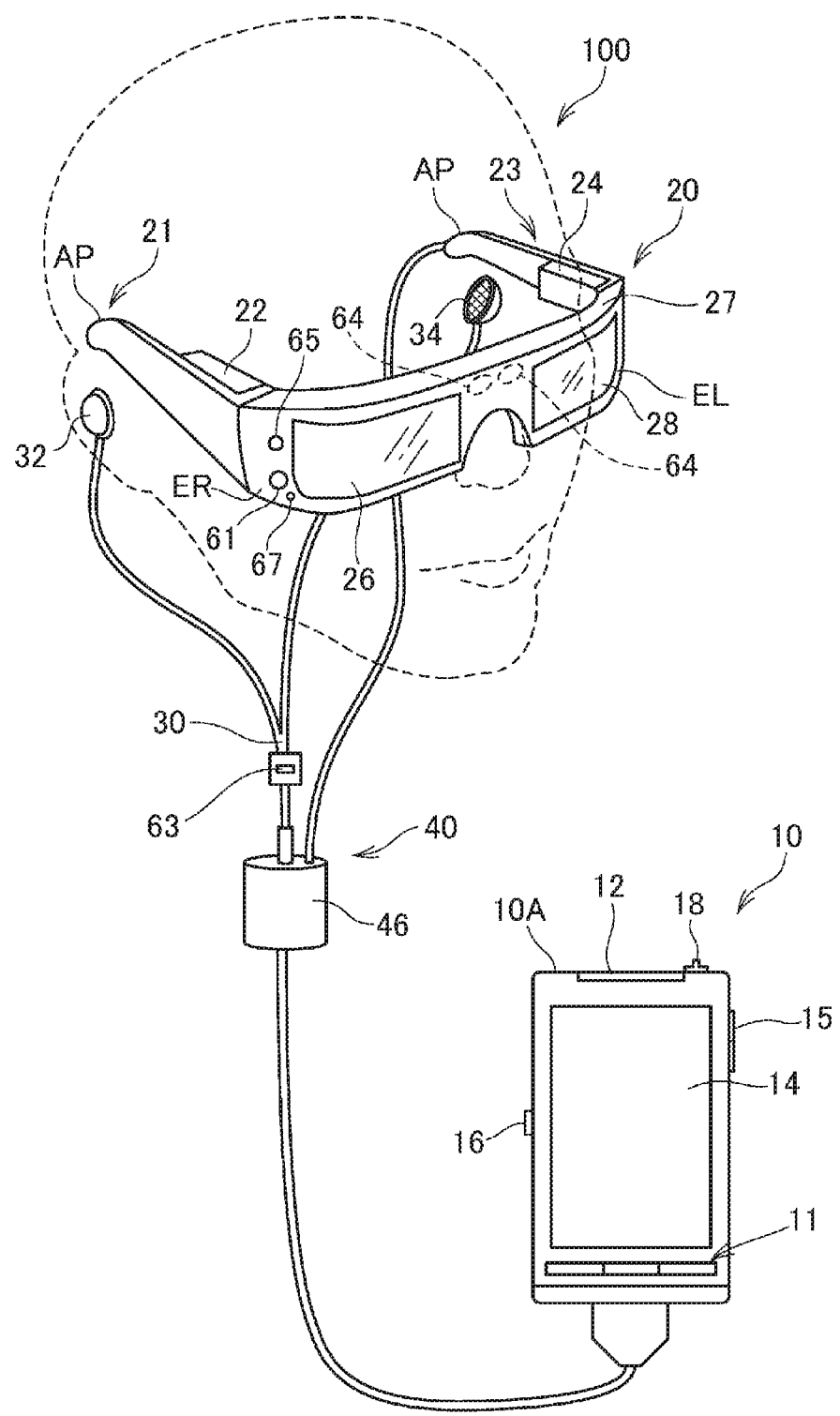
FIG. 1 is an explanatory diagram showing an exterior configuration of an HMD.

FIG. 1 is an explanatory diagram showing an exterior configuration of an HMD (Head Mounted Display: a head-mounted display device) 100 according to an embodiment applied with the invention.

The HMD 100 is a display device including an image display section 20 (a display section) that causes a user to visually recognize a virtual image in a state in which the image display section 20 is worn on the head of the user and a control device 10 that controls the image display section 20. As shown in FIG. 1, the control device 10 includes a case 10A (referred to as a housing or a main body as well) having a flat box shape and includes various sections explained below in the case 10A. Various buttons 11, switches, a track pad 14, and the like that receive operation by the user are provided on the surface of the case 10A. The user operates the buttons 11, the switches, the track pad 14, and the like, whereby the control device 10 functions as a controller of the HMD 100.

The image display section 20 is a wearing body having an eyeglass shape worn on the head of the user. The image display section 20 is configured to be capable of transmitting external light. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling of the right light guide plate 26 and the left light guide plate 28 is located in the middle of the forehead of the user in the worn state in which the user wears the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the head of the user by the nose pad section and the right holding section 21 and the left holding section 23. A belt (not shown in the figure) in contact with the back of the head of the user in the worn state of the image display section 20 may be coupled to the right holding section 21 and the left holding section 23. In this case, the image display section 20 can be held on the head of the user by the belt.

The right display unit 22 is a unit related to display of an image by the right light guide plate 26. The right display unit 22 is provided in the right holding section 21 and located in the vicinity of the right temporal region of the user in the worn state. The left display unit 24 is a unit related to display of an image by the left light guide plate 28. The left display unit 24 is provided in the left holding section 23 and located in the vicinity of the left temporal region of the user in the worn state. Note that the right display unit 22 and the left display unit 24 are collectively simply referred to as "display driving section" as well.

The right light guide plate 26 and the left light guide plate 28 in this embodiment are optical sections formed of light transmissive resin or the like and are configured by, for example, prisms. The right light guide plate 26 and the left light guide plate 28 guide image lights output by the right display unit 22 and the left display unit 24 to the eyes of the user.

The image display section 20 guides image lights respectively generated by the right display unit 22 and the left display unit 24 to the right light guide plate 26 and the left light guide plate 28 and displays an image by causing the user to visually recognize a virtual image with the image light. When the external light is transmitted through the right light guide plate 26 and the left light guide plate 28 and made incident on the eyes of the user from the front of the user, the image lights forming the virtual image and the external light are made incident on the eyes of the user. Visibility of the virtual image is affected by the intensity of the external light. Therefore, it is possible to adjust easiness of the visual recognition of the virtual image by, for example, disposing a right electronic shade 227 and a left electronic shade 247 (FIG. 5) in the front frame 27. The right electronic shade 227 and the left electronic shade 247 are equivalent to the "transmittance adjusting section" according to the invention.

A camera 61 is disposed in the front frame 27 of the image display section 20. The camera 61 desirably images an outside scene direction visually recognized by the user in the state in which the image display section 20 is worn. The camera 61 is provided in a position not blocking the external light transmitted through the right light guide plate 26 and the left light guide plate 28 on the front surface of the front frame 27. In an example shown in FIG. 1, the camera 61 is disposed on the end portion ER side of the front frame 27. The camera 61 may be disposed on the end portion EL side or may be disposed in the coupling portion of the right light guide plate 26 and the left light guide plate 28.

The camera 61 is a digital camera including an imaging device such as a CCD or a CMOS and an imaging lens. Although the camera 61 in this embodiment is a monocular camera, the camera 61 may be configured by a stereo camera. The camera 61 images at least a part of an outside scene (a real space) in the front side direction of the HMD 100, in other words, a visual field direction of the user in the state in which the HMD 100 is mounted. In other words, the camera 61 images a range or a direction overlapping the visual field of the user and images a direction gazed by the user. The breadth of an angle of view of the camera 61 can be set as appropriate. However, in this embodiment, as explained below, the angle of view includes an outside world visually recognized by the user through the right light guide plate 26 and the left light guide plate 28. More desirably, an imaging range of the camera 61 is set such that the entire visual field of the user visually recognizable through the right light guide plate 26 and the left light guide plate 28 can be imaged.

The camera 61 executes imaging according to control by an imaging control section 149 included in a control section 150 (FIG. 6) and outputs captured image data to the imaging control section 149.

The HMD 100 includes distance sensors 64. The distance sensors 64 are disposed in a boundary portion between the right light guide plate 26 and the left light guide plate 28. In the state in which the user wears the image display section 20, the position of the distance sensors 64 is substantially the middle of both the eyes of the user in the horizontal direction and above both the eyes of the user in the vertical direction.

The distance sensors 64 detect the distance to a measurement target object located in a preset measurement direction. The distance sensors 64 include, for example, light sources such as LEDs or laser diodes and light receiving sections that receive reflected light of light emitted by the light sources and reflected on the measurement target object. In this case, the distance sensors 64 execute triangulation processing and distance measurement processing based on a time difference according to control by the control section 150 explained below. The distance sensors 64 may be configured to include sound sources that emit ultrasound and detecting sections that receive the ultrasound reflected on the measurement target object. In this case, the distance sensors 64 execute the distance measurement processing on the basis of a time difference until the reflection of the ultrasound according to the control by the control section 150. Note that the distance sensors 64 may include the light sources and the light receiving sections or the sound sources and the detecting sections. The control section 150 may perform the distance measurement processing. The measurement direction of the distance sensors 64 in this embodiment is the front side direction of the head-mounted display device 100 and overlaps the imaging direction of the camera 61.

Figure 2:
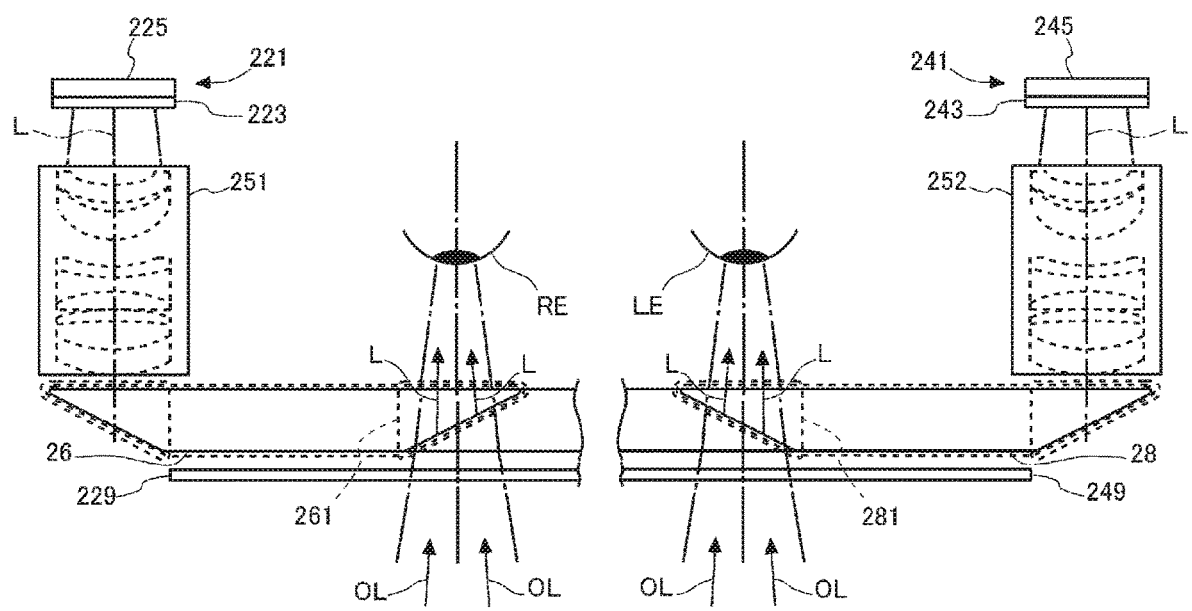
FIG. 2 is a diagram showing the configuration of an optical system of an image display section.

FIG. 2 is a main part plan view showing the configuration of an optical system included in the image display section 20. In FIG. 2, a left eye LE and a right eye RE of the user are shown for explanation.

As shown in FIG. 2, the right display unit 22 and the left display unit 24 are symmetrically configured. As a component for causing the right eye RE of the user to visually recognize an image, the right display unit 22 includes an OLED (Organic Light Emitting Diode) unit 221 that emits image light and a right optical system 251 including a lens group for guiding image light L emitted by the OLED unit 221. The image light L is guided to the right light guide plate 26 by the right optical system 251.

Figure 6:
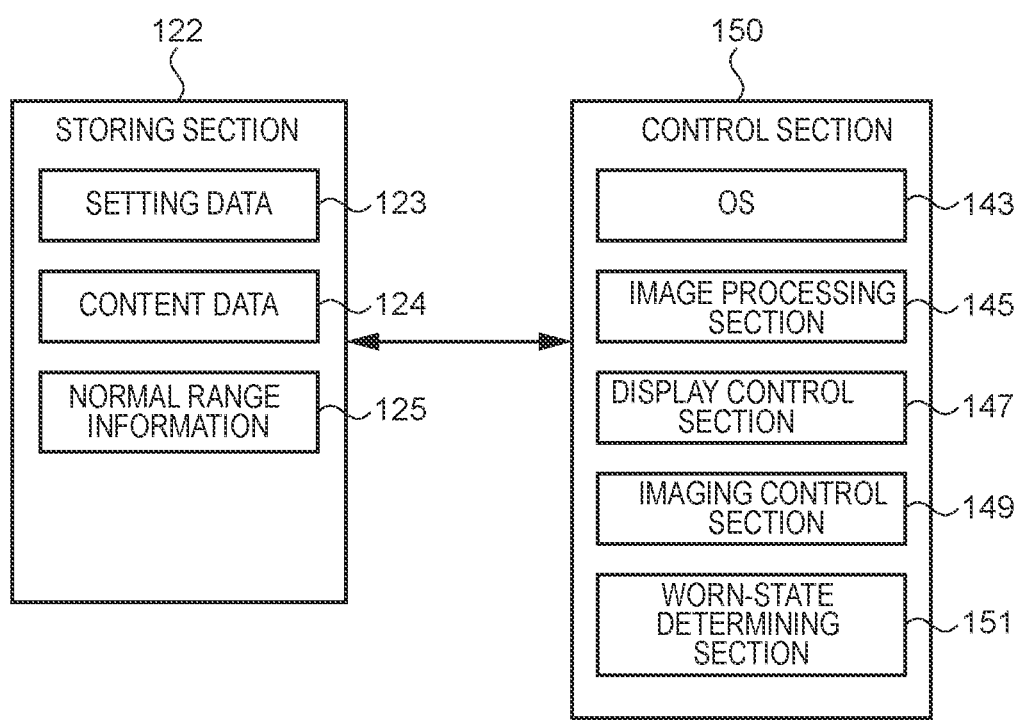
FIG. 6 is a block diagram of a control section and a storing section.

The OLED unit 221 includes an OLED panel 223 and an OLED driving circuit 225 that drives the OLED panel 223. The OLED panel 223 is a self-emitting display panel configured by arranging, in a matrix shape, light emitting elements that emit lights with organic electroluminescence and respectively emit color lights of R (red), G (green), and B (blue). The OLED panel 223 includes a plurality of pixels, one pixel of which is a unit including one each of R, G, and B elements. The OLED panel 223 forms an image with the pixels arranged in the matrix shape. The OLED driving circuit 225 executes selection of a light emitting element included in the OLED panel 223 and energization to the light emitting element and causes the light emitting element of the OLED panel 223 to emit light according to the control by the control section 150 (FIG. 6). The OLED driving circuit 225 is fixed to the rear side of a rear surface, that is, a light emitting surface of the OLED panel 223 by bonding or the like. The OLED driving circuit 225 may be configured by, for example, a semiconductor device, which drives the OLED panel 223, and may be mounted on a substrate (not shown in the figure) fixed to the rear surface of the OLED panel 223.

Note that the OLED panel 223 may be configured by arranging, in a matrix shape, light emitting elements that emit white light and disposing color filters corresponding to the colors of R, G, and B to be superimposed one on top of another. The OLED panel 223 of a WRGB configuration including a light emitting element that emits W (white) light in addition to the light emitting elements that respectively radiate the color lights of R, G, and B may be used.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed in the right light guide plate 26. The image light L is reflected on the half mirror 261 and emitted from the right light guide plate 26 toward the right eye RE. The image light L forms an image on the retina of the right eye RE and causes the user to visually recognize the image.

The left display unit 24 includes, as components for causing the left eye LE of the user to visually recognize an image, an OLED unit 241 that emits image light and a left optical system 252 including a lens group for guiding the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a self-emitting display panel configured the same as the OLED panel 223. The OLED driving circuit 245 executes selection of a light emitting element included in the OLED panel 243 and energization to the light emitting element and causes the light emitting element of the OLED panel 243 to emit light according to the control by the control section 150 (FIG. 6). The OLED driving circuit 245 is fixed to the rear side of a rear surface, that is, a light emitting surface of the OLED panel 243 by bonding or the like. The OLED driving circuit 245 may be configured by, for example, a semiconductor device, which drives the OLED panel 243, and may be mounted on a substrate (not shown in the figure) fixed to the rear surface of the OLED panel 243.

The left optical system 252 includes a collimate lens that changes the image light L emitted from the OLED panel 243 to a light beam in a parallel state. The image light L changed to the light beam in the parallel state by the collimate lens is made incident on the left light guide plate 28. The left light guide plate 28 is an optical element in which a plurality of reflection surfaces that reflect the image light L are formed and is, for example, a prism. The image light L is guided to the left eye LE side through a plurality of times of reflection on the inside of the left light guide plate 28. A half mirror 281 (a reflection surface) located in front of the left eye LE is formed in the left light guide plate 28. The image light L is reflected on the half mirror 281 and emitted from the left light guide plate 28 toward the left eye LE. The image light L forms an image on the retina of the left eye LE and causes the user to visually recognize the image.

With this configuration, the HMD 100 functions as a see-through type display device. That is, the image light L reflected on the half mirror 261 and external light OL transmitted through the right light guide plate 26 are made incident on the right eye RE of the user. The image light L reflected on the half mirror 281 and the external light OL transmitted through the half mirror 281 are made incident on the left eye LE. In this way, the HMD 100 makes the image light L of the image processed on the inside and the external light OL incident on the eyes of the user to be superimposed one on top of the other. For the user, the outside scene is seen through the right light guide plate 26 and the left light guide plate 28. An image formed by the image light L is visually recognized over the outside scene.

The half mirrors 261 and 281 are image extracting sections that reflect image lights respectively output by the right display unit 22 and the left display unit 24 and extract images. The half mirrors 261 and 281 can be considered display sections.

Note that the left optical system 252 and the left light guide plate 28 are collectively referred to as "left light guide section" as well. The right optical system 251 and the right light guide plate 26 are collectively referred to as "right light guide section" as well. The configuration of the right light guide section and the left light guide section is not limited to the example explained above. Any system can be used as long as a virtual image is formed in front of the eyes of the user using the image lights. For example, a diffraction grating may be used or a semitransmitting reflection film may be used.

The image display section 20 includes the right electronic shade 227 and the left electronic shade 247. The right electronic shade 227 includes a shade driving section 228 (FIG. 6) and a liquid crystal panel 229. The left electronic shade 247 includes a shade driving section 248 (FIG. 6) and a liquid crystal panel 249. The liquid crystal panels 229 and 249 are equivalent to the "transmittance adjustment plate" according to the invention.

The liquid crystal panel 229 of the right electronic shade 227 is provided on the front surface side of the right light guide plate 26, that is, the opposite side of the side of the head of the user. As shown in FIG. 2, the liquid crystal panel 229 is disposed apart from the right light guide plate 26. This is because, if the liquid crystal panel 229 is stuck to the right light guide plate 26, it is likely that entire reflection of the image light L on the right light guide plate 26 is hindered.

The liquid crystal panel 249 of the left electronic shade 247 is provided on the front surface side of the left light guide plate 28, that is, the opposite side of the side of the head of the user. As shown in FIG. 2, the liquid crystal panel 249 is disposed apart from the left light guide plate 28.

The liquid crystal panels 229 and 249 can also be disposed to be superimposed on the right light guide plate 26 and the left light guide plate 28. In this case, a material having a refractive index lower than the refractive index of the right light guide plate 26 and the left light guide plate 28 needs to be stuck to the entire reflection surfaces of the right light guide plate 26 and the left light guide plate 28.

The liquid crystal panels 229 and 249 are transmissive liquid crystal panels in which a plurality of pixels are arranged in a matrix shape. As the liquid crystal panels 229 and 249, TN (twisted nematic) liquid crystal, guest host liquid crystal, PDLC (Polymer Dispersed Liquid Crystal), and the like can be used. Instead of the liquid crystal panels 229 and 249, electrochromic or gaschromic may be used.

The liquid crystal panels 229 and 249 increase or reduce, in pixel units, the transmittance of external light guided from the outside to the eyes RE of the user according to an increase or a decrease of a supplied voltage. In the right electronic shade 227 and the left electronic shade 247 in this embodiment, the transmittance of the external light is 100% in a state without the supplied voltage and is 0% (the external light is blocked) in a state in which the supplied voltage is the maximum.

Referring back to FIG. 1, the control device 10 and the image display section 20 are connected by a connection cable 40. The connection cable 40 is detachably connected to a connector (not shown in the figure) provided in a lower part of the case 10A and is connected to various circuits provided on the inside of the image display section 20 from the distal end of the left holding section 23. The connection cable 40 may include a metal cable or an optical fiber for transmitting digital data and may include a metal cable for transmitting an analog signal. A connector 46 is provided halfway in the connection cable 40. The connector 46 is a jack for connecting a stereo mini-plug. The connector 46 and the control device 10 are connected by, for example, a line for transmitting an analog sound signal. In the configuration example shown in FIG. 1, a headset 30 including a right earphone 32 and a left earphone 34 configuring a stereo headphone and a microphone 63 is connected to the connector 46.

For example, as shown in FIG. 1, the microphone 63 is disposed such that a sound collecting section of the microphone 63 faces a line of sight direction of the user. The microphone 63 collects sound and outputs a sound signal to a sound interface 182 (FIG. 6). For example, the microphone 63 may be a monaural microphone or a stereo microphone, may be a microphone having directivity, or may be a nondirectional microphone.

The control device 10 includes, as operation sections operated by the user, the buttons 11, an LED indicator 12, the track pad 14, an up/down key 15, a changeover switch 16, and a power switch 18. These operation sections are disposed on the surface of the case 10A. The LED indicator 12 is equivalent to the "notifying section" according to the invention.

The buttons 11 include a menu key, a home key, and a return key for performing, for example, operation of an operating system (hereinafter abbreviated as OS) 143 (FIG. 6) executed by the control device 10 and, in particular, includes keys and switches displaced by pressing operation among the keys and the switches. The LED indicator 12 is lit or flashed according to an operation state of the HMD 100. The up/down key 15 is used to input an instruction for an increase or a reduction of sound volume output from the right earphone 32 and the left earphone 34 and input an instruction for an increase and a reduction of brightness of display of the image display section 20. The changeover switch 16 is a switch for changing over an input corresponding to operation of the up-down key 15. The power switch 18 is a switch for changing over ON/OFF of a power supply of the HMD 100 and is, for example, a slide switch.

The track pad 14 includes an operation surface for detecting contact operation and outputs an operation signal according to operation on the operation surface. A detection system on the operation surface is not limited. An electrostatic system, a pressure detection system, an optical system, or the like can be adopted. Contact (touch operation) on the track pad 14 is detected by a touch sensor 13 (FIG. 6) explained below.

Figure 3:
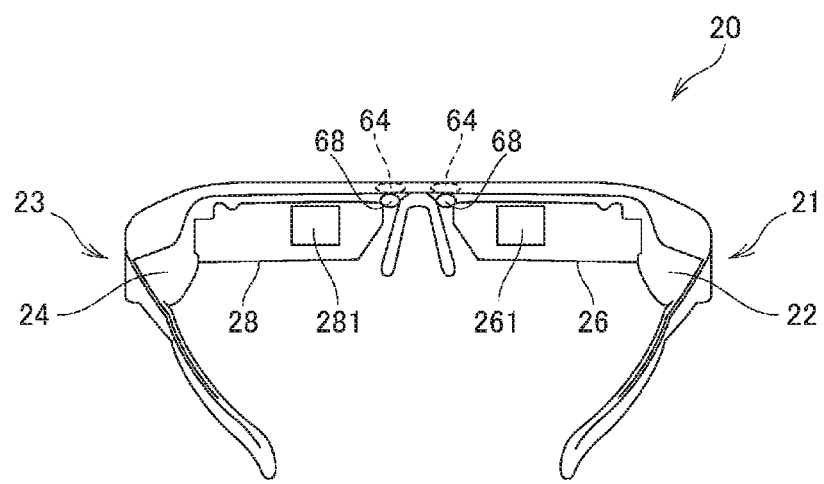
FIG. 3 is a main part perspective view of the image display section viewed from a head side of a user.
Figure 4:
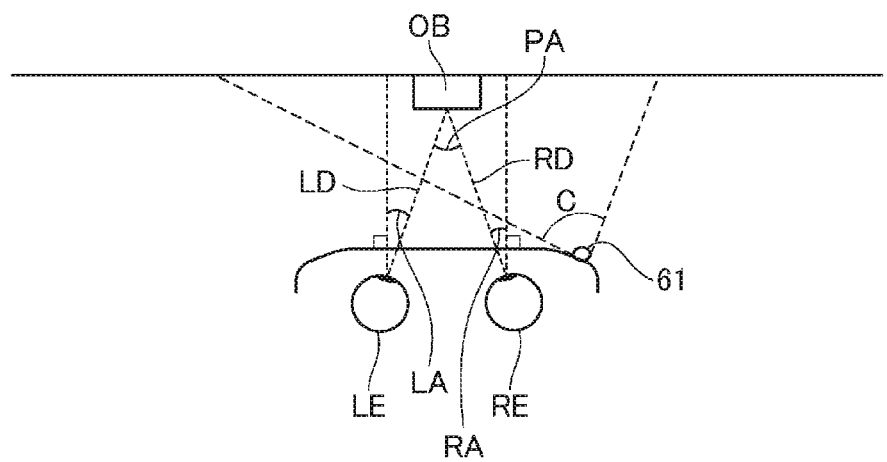
FIG. 4 is an explanatory diagram of an angle of view of a camera.

FIGS. 3 and 4 are diagrams showing a main part configuration of the image display section 20. FIG. 3 is a main part perspective view of the image display section 20 viewed from the head side of the user. FIG. 4 is an explanatory diagram of an angle of view of the camera 61. Note that, in FIG. 3, illustration of the connection cable 40 is omitted.

In FIG. 3, a side in contact with the head of the user of the image display section 20, in other words, a side visible to the right eye RE and the left eye LE of the user is shown. In other words, the rear side of the right light guide plate 26 and the left light guide plate 28 is visible.

In FIG. 3, the half mirror 261 for irradiating image light on the right eye RE of the user and the half mirror 281 for irradiating image light on the left eye LE of the user are seen as substantially square regions. The entire right light guide plate 26 and left light guide plate 28 including the half mirrors 261 and 281 transmit external light as explained above. Therefore, for the user, an outside scene is visually recognized through the entire right light guide plate 26 and left light guide plate 28 and rectangular display images are visually recognized in the positions of the half mirrors 261 and 281.

The camera 61 is disposed at the end portion on the right side in the image display section 20 as explained above and images a direction that both the eyes of the user face, that is, the front for the user. FIG. 4 is a diagram schematically showing the position of the camera 61 in plan view together with the right eye RE and the left eye LE of the user. An angle of view (the imaging range) of the camera 61 is indicated by C. Note that, although the angle of view C in the horizontal direction is shown in FIG. 4, an actual angle of view of the camera 61 also expands in the up-down direction as in a general digital camera.

The optical axis of the camera 61 is set in a direction including line of sight directions of the right eye RE and the left eye LE. An outside scene visually recognizable by the user in a state in which the user wears the HMD 100 is not always infinity. For example, as shown in FIG. 4, when the user gazes an object OB with both the eyes, lines of sight of the user are directed to the object OB as indicated by signs RD and LD in the figure. In this case, the distance from the user to the object OB is often approximately 30 cm to 10 m and more often approximately 1 m to 4 m. Therefore, concerning the HMD 100, standards of an upper limit and a lower limit of the distance from the user to the object OB during a normal use may be set. The standards may be calculated by researches and experiments or the user may set the standards. The optical axis and the angle of view of the camera 61 are desirably set such that the object OB is included in the angle of view when the distance to the object OB during the normal use is equivalent to the set standard of the upper limit and when the distance is equivalent to the set standard of the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. Further, a stable field of fixation in which a gazing point gazed by the human is quickly and stably seen is approximately 60 to 90 degrees in the horizontal direction and approximately 45 to 70 degrees in the vertical direction. In this case, when the gazing point is the object OB shown in FIG. 4, a field of view of approximately 30 degree in the horizontal direction and approximately 20 degrees in the vertical direction centering on the lines of sight RD and LD is the effective field of view. A field of view of approximately 60 to 90 degrees in the horizontal direction and approximately 45 to 70 degrees in the vertical direction is the stable field of fixation. A field of view of approximately 200 degrees in the horizontal direction and approximately 125 degrees in the vertical direction is the angular field of view. Further, an actual field of view visually recognized by the user through the image display section 20 and through the right light guide plate 26 and the left light guide plate 28 can be referred to as real field of view (FOV). In the configuration in this embodiment shown in FIGS. 1 and 2, the real field of view is equivalent to an actual field of view visually recognized by the user through the right light guide plate 26 and the left light guide plate 28. The real field of view is narrower than the angular field of view and the stable field of fixation but is wider than the effective field of view.

The angle of view C of the camera 61 desirably enables imaging of a range wider than the field of view of the user. Specifically, the angle of view C is desirably wider than at least the effective field of view of the user. The angle of view C is more desirably wider than the real field of view of the user. The angle of view C is still more desirably wider than the stable field of fixation of the user. The angle of view C is most desirably wider than the angular field of view of both the eyes of the user.

The camera 61 may include a so-called wide-angle lens as an imaging lens and may be capable of imaging a wide angle of view. The wide-angle lens may include lenses called super-wide angle lens and semi-wide angle lens. The wide-angle lens may be a single focus lens or may be a zoom lens. The camera 61 may include a lens group including a plurality of lenses.

The distance sensors 64 are disposed to face forward in the center between the right light guide plate 26 and the left light guide plate 28. The distance sensors 64 are configured to be capable of detecting the distance from the center position of the image display section 20 to an object located in the front direction and detects, for example, the distance to the object OB. The user wearing the HMD 100 turns the head to a gazing direction. Therefore, a gazing target can be considered to be present in the front of the image display section 20. Therefore, if the front of the image display section 20 is assumed to be a detecting direction, the distance sensors 64 disposed in the center of the image display section 20 can detect the distance to the target gazed by the user.

As shown in FIG. 3, inner cameras 68 are disposed on the user side of the image display section 20. A pair of inner cameras 68 is provided in the center position between the right light guide plate 26 and the left light guide plate 28 to respectively correspond to the right eye RE and the left eye LE of the user. The inner cameras 68 are a pair of cameras that respectively images the right eye RE and the left eye LE of the user. The inner cameras 68 perform the imaging according to the control by the control section 150 (FIG. 6). The control section 150 analyzes captured image data 300 (FIGS. 7, 8, and 10) of the inner cameras 68. For example, the control section 150 detects reflected light on the eyeball surfaces of the right eye RE and the left eye LE and an image of the pupils from the captured image data 300 of the inner cameras 68 and specifies a line of sight direction of the user. The control section 150 may detect an image of the eyes of the user from the captured image data 300 of the inner cameras 68 and determine a worn state on the head of the image display section 20 on the basis of the positions of the eyes in the captured image data 300.

When detecting the line of sight directions of the right eye RE and the left eye LE from the captured images of the inner cameras 68, the control section 150 can calculate an angle of convergence of the right eye RE and the left eye LE. In FIG. 4, the angle of convergence is indicated by a sign PA. The angle of convergence PA corresponds to the distance to the object OB gazed by the user. That is, when the user three-dimensionally visually recognizes an image or an object, the angle of convergence of the right eye RE and the left eye LE is decided according to the distance to the visually recognized target. Therefore, it is possible to calculate the distance of the gazing of the user by detecting the angle of convergence. It is possible to induce a stereoscopic vision by displaying an image to induce the angle of convergence of the user.

The angle of convergence can be calculated from, for example, the captured image data 300 of the inner cameras 68. For example, a line of sight direction of the right eye RE is calculated from the captured image data 300 of the inner cameras 68. An angle LA in the line of sight direction of the right eye RE with respect to the front direction of the right eye RE is calculated from the line of sight direction. Similarly, a line of sight direction of the left eye LE is calculated from the captured image data 300 of the inner cameras 68. An angle RA in the line of sight direction of the left eye LE with respect to the front direction of the left eye LE is calculated from the line of sight direction. The angle of convergence PA is equal to a sum of the angles LA and RA. It is possible to easily calculate the angle of convergence PA.

Figure 5:
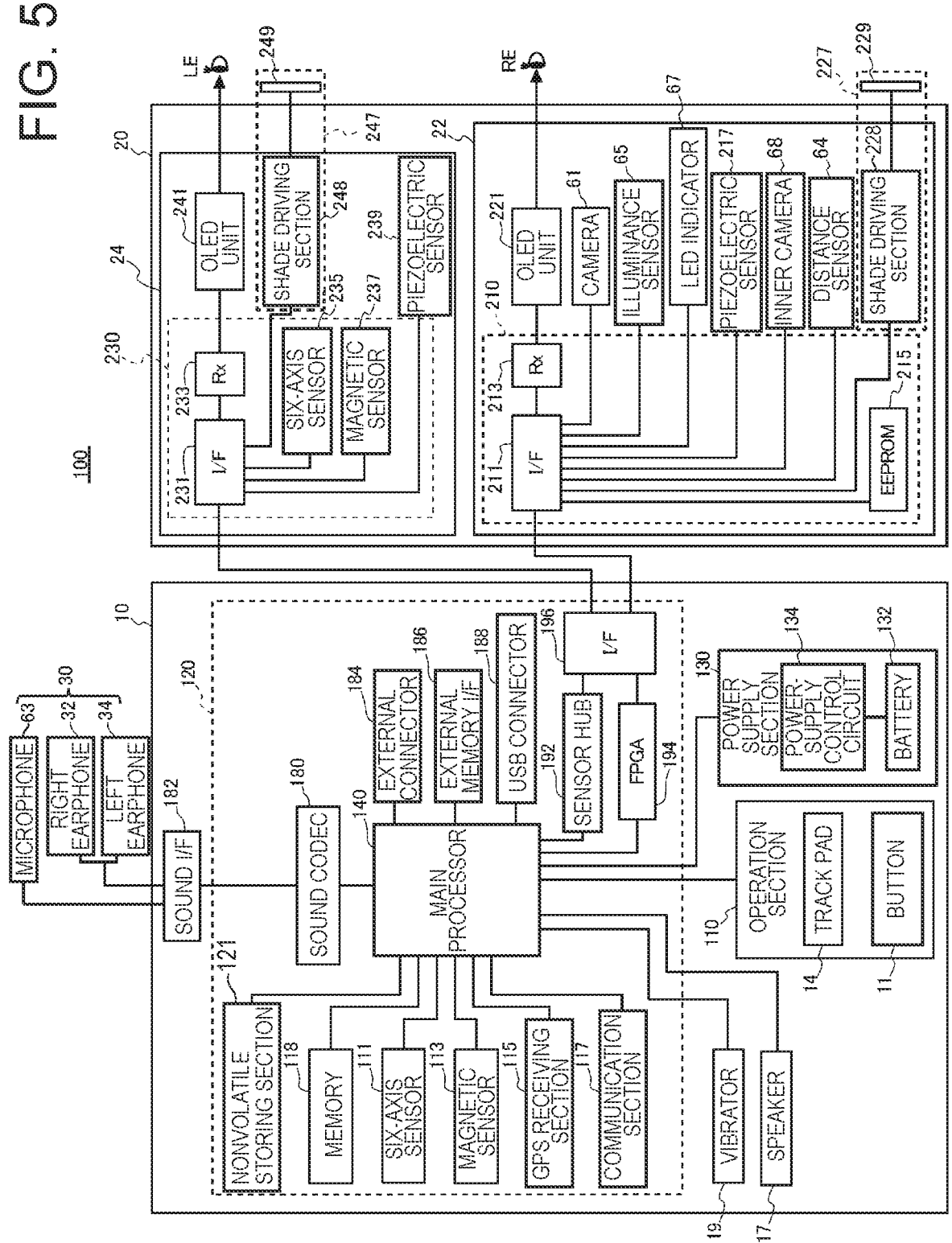
FIG. 5 is a block diagram of sections configuring the HMD.

FIG. 5 is a block diagram showing the configurations of the sections configuring the HMD 100.

The control device 10 includes a main processor 140 that executes a computer program and controls the HMD 100. A memory 118 and a nonvolatile storing section 121 are connected to the main processor 140. The track pad 14 and an operation section 110 are connected to the main processor 140 as input devices. A six-axis sensor 111, a magnetic sensor 113, and a GPS 115 are connected to the main processor 140 as sensors. A communication section 117, a sound codec 180, an external connector 184, an external memory interface 186, the USB connector 188, a sensor hub 192, and an FPGA 194 are connected to the main processor 140. These sections function as interfaces with the outside.

The main processor 140 is mounted on a controller board 120 incorporated in the control device 10. The memory 118, the nonvolatile storing section 121, and the like may be mounted on the controller board 120 in addition to the main processor 140. In this embodiment, the six-axis sensor 111, the magnetic sensor 113, the GPS 115, the communication section 117, the memory 118, the nonvolatile storing section 121, the sound codec 180, and the like are mounted on the controller board 120. The external connector 184, the external memory interface 186, the USB connector 188, the sensor hub 192, the FPGA 194, and an interface 196 may be mounted on the controller board 120.

The memory 118 configures a work area where, when the main processor 140 executes a computer program, the main processor 140 temporarily stores the computer program to be executed and data to be processed. The nonvolatile storing section 121 is configured by a flash memory or an eMMC (embedded Multi Media Card). The nonvolatile storing section 121 stores the computer program to be executed by the main processor 140 and various data to be processed by the main processor 140 executing the computer program.

The operation section 110 includes the buttons 11 and the track pad 14. The track pad 14 includes an operation surface (not shown in the figure). The track pad 14 detects touch operation on the operation surface and specifies an operation position on the operation surface of the detected touch operation. The track pad 14 outputs an operation signal indicating the specified operation position of the touch operation to the main processor 140.

The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted.

The magnetic sensor 113 is, for example, a three-axis terrestrial magnetism sensor.

The GPS (Global Positioning System) 115 includes a not-shown GPS antenna, receives radio signals transmitted from GPS satellites, and detects a coordinate of a present position of the control device 10.

The six-axis sensor 111, the magnetic sensor 113, and the GPS 115 output detection values to the main processor 140 according to sampling cycles designated in advance. Alternatively, the six-axis sensor 111, the magnetic sensor 113, the GPS 115 output, in response to a request of the main processor 140, the detection values to the main processor 140 at timing designated by the main processor 140.

The communication section 117 executes wireless communication between the communication section 117 and an external apparatus. The communication section 117 includes an antenna, an RF circuit, a baseband circuit, and a communication control circuit. Alternatively, the communication section 117 is configured by a device obtained by integrating the antenna, the RF circuit, the baseband circuit, and the communication control circuit, and the like. The communication section 117 performs wireless communication conforming to the standards such as the Bluetooth (registered trademark) and the wireless LAN (including Wi-Fi (registered trademark)).

The sound interface 182 is an interface that inputs and outputs sound signals. In this embodiment, the sound interface 182 includes the connector 46 (FIG. 1) provided in the connection cable 40. The sound codec 180 is connected to the sound interface 182 and performs encoding/decoding of the sound signals input and output via the sound interface 182. The sound codec 180 may include an A/D converter that performs conversion from an analog sound signal into digital sound data and a D/A converter that performs conversion opposite to the conversion of the A/D converter. For example, the HMD 100 in this embodiment outputs sound with the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector to which an external apparatus communicating with the main processor 140 is connected. The external connector 184 is an interface to which the external apparatus is connected, for example, when the external apparatus is connected to the main processor 140 and debagging of a computer program executed by the main processor 140 and collection of a log of the operation of the HMD 100 are performed.

The external memory interface 186 is an interface to which a portable memory device is connectable. The external memory interface 186 includes, for example, a memory card slot, into which a card-type recording medium is inserted to enable reading of data, and an interface circuit. A size, a shape, and a standard of the card-type recording medium in this case are not limited and can be changed as appropriate.

The USB (Universal Serial Bus) connector 188 includes a connector conforming to the USB standard and an interface circuit. A USB memory device, a smartphone, a computer, and the like can be connected to the USB connector 188. A size and a shape of the USB connector 188 and a version of the USB standard matching the USB connector 188 can be selected and changed as appropriate.

The HMD 100 includes a vibrator 19. The vibrator 19 is equivalent to the "notifying section" according to the invention. The vibrator 19 includes a motor (not shown in the figure) and an eccentric rotor (not shown in the figure). The vibrator 19 generates vibration according to the control by the main processor 140. For example, when operation on the operation section 110 is detected or when the power supply of the HMD 100 is turned on and off, the HMD 100 generates vibration with the vibrator 19 in a predetermined vibration pattern.

The HMD 100 includes a speaker 17. The speaker 17 is equivalent to the "notifying section" according to the invention.

The main processor 140 acquires, for example, a sound signal included in content data 124 (FIG. 6), amplifies the acquired sound signal, and outputs the amplified sound signal from the speaker 17.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196.

The right display unit 22 and the left display unit 24 of the image display section 20 are respectively connected to the control device 10. As shown in FIG. 1, in the HMD 100, the connection cable 40 is connected to the left holding section 23. A wire joined to the connection cable 40 is laid on the inside of the image display section 20. The right display unit 22 and the left display unit 24 are respectively connected to the control device 10.

The right display unit 22 includes a display unit board 210. An interface (I/F) 211 connected to the interface 196, a receiving section (Rx) 213 that receives data input from the control device 10 via the interface 211, and an EEPROM 215 (a storing section) are mounted on the display unit board 210.

The interface 211 connects the receiving section 213, the EEPROM 215, the OLED unit 221, the camera 61, an illuminance sensor 65, an LED indicator 67, a piezoelectric sensor 217, the inner cameras 68, the distance sensors 64, and the shade driving section 228 to the control device 10.

The EEPROM (Electrically Erasable Programmable Read-Only Memory) 215 stores various data to enable the main processor 140 to read the data. The EEPROM 215 stores, for example, data concerning a light emission characteristic and a display characteristic of the OLED units 221 and 241 included in the image display section 20 and data concerning characteristics of the sensors included in the right display unit 22 or the left display unit 24. These data are generated by a test during factory shipment of the HMD 100 and written in the EEPROM 215. After the shipment, the main processor 140 can perform processing using the data of the EEPROM 215.

The camera 61 executes imaging according to a signal input via the interface 211 and outputs captured image data or a signal indicating an imaging result to the control device 10.

As shown in FIG. 1, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity).

As shown in FIG. 1, the LED indicator 67 is disposed near the camera 61 at the end portion ER of the front frame 27. The LED indicator 67 is lit during execution of imaging by the camera 61 to notify that the imaging is being performed.

The piezoelectric sensor 217 is provided in, for example, the right holding section 21 and in a position in contact with the ear of the user in a state in which the image display section 20 is worn on the head of the user. When the image display section 20 is worn on the head of the user and the ear of the user comes into contact with the piezoelectric sensor 217, the piezoelectric sensor 217 outputs, to the control device 10, a signal indicating that the contact is detected.

The inner cameras 68 execute imaging according to a signal input from the control device 10 via the interface 211 and output the captured image data 300 or a signal indicating an imaging result to the control device 10. In the explanation in this embodiment, the inner cameras 68 execute imaging and output captured image data to the control device 10. In FIG. 6, one inner camera 68 is shown. However, the pair of inner cameras 68 shown in FIG. 3 may simultaneously operate. The respective pair of inner cameras 68 may be connected to the interface 211 and independently operate.

The distance sensors 64 execute distance detection according to a signal input from the control device 10 via the interface 211 and output a signal indicating a detection result to the control device 10. In FIG. 6, one distance sensor 64 is shown. However, the pair of distance sensors 64 shown in FIG. 3 may simultaneously operate. The respective pair of distance sensors 64 may be connected to the interface 211 and independently operate.

The shade driving section 228 controls, according to the main processor 140, a voltage supplied to the right electronic shade 227 and increases or reduces, in pixel units, the transmittance of external light of the right electronic shade 227.

The receiving section 213 receives data transmitted by the main processor 140 via the interface 211. When receiving image data of an image displayed by the OLED unit 221, the receiving section 213 outputs the received image data to the OLED driving circuit 225 (FIG. 2).

The left display unit 24 includes a display unit board 230. An interface (I/F) 231 connected to the interface 196 and a receiving section (Rx) 233 that receives data input from the control device 10 via the interface 231 are mounted on the display unit board 230. A six-axis sensor 235 and a magnetic sensor 237 are mounted on the display unit board 230.

The interface 231 connects the receiving section 233, the six-axis sensor 235, the magnetic sensor 237, a piezoelectric sensor 239, and the shade driving section 248 to the control device 10.

The six-axis sensor 235 is a motion sensor (an inertial sensor) including a three-axis acceleration sensor and a three-axis gyro (angular velocity) sensor. As the six-axis sensor 235, an IMU (Inertial Measurement Unit) obtained by modularizing the sensors may be adopted.

The magnetic sensor 237 is, for example, a three-axis terrestrial magnetism sensor.

The piezoelectric sensor 239 is provided in, for example, the left holding section 23 and in a position in contact with the ear of the user in a state in which the image display section 20 is worn on the head of the user. When the image display section 20 is worn on the head of the user and the ear of the user comes into contact with the piezoelectric sensor 239, the piezoelectric sensor 239 outputs, to the control device 10, a signal indicating that the contact is detected.

The shade driving section 248 controls, according to the main processor 140, a voltage supplied to the left electronic shade 247 and increases or reduces, in pixel units, the transmittance of external light of the left electronic shade 247.

The interfaces 211 and 231 are connected to the sensor hub 192. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a function of temporarily retaining the detection values of the sensors according to the timing of the output to the main processor 140. The sensor hub 192 may include a function of coping with differences in signal formats or data formats of output values of the sensors, converting the output values into data of a standardized data format, and outputting the data to the main processor 140.

The sensor hub 192 starts and stops energization to the LED indicator 67 according to the control by the main processor 140 and lights or flashes the LED indicator 67 according to timings when the camera 61 starts and ends imaging.

The control device 10 includes a power supply section 130 and operates with electric power supplied from the power supply section 130. The power supply section 130 includes a chargeable battery 132 and a power-supply control circuit 134 that performs detection of a residual capacity of the battery 132 and control of charging to the battery 132. The power-supply control circuit 134 is connected to the main processor 140 and outputs a detection value of the residual capacity of the battery 132 or a detection value of a voltage to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The HMD 100 may include an interface (not shown in the figure) that connects various external devices functioning as supply sources of contents. The interface may be an interface adapted to wired connection such as a USB interface, a micro USB interface, or an interface for a memory card or may be configured by a wireless communication interface. An external device in this case is an image supply device that supplies an image to the HMD 100. A personal computer (PC), a cellular phone terminal, a portable game machine, or the like is used. In this case, the HMD 100 can output an image and sound based on content data input from the external devices.

FIG. 6 is a functional block diagram of a storing section 122 and the control section 150 configuring the control system of the control device 10. The storing section 122 shown in FIG. 6 is a logical storing section configured by the nonvolatile storing section 121 (FIG. 5). The storing section 122 may include the EEPROM 215. The main processor 140 executes computer programs, whereby the control section 150 and the various functional sections included in the control section 150 are formed by cooperation of software and hardware. The control section 150 and the functional sections configuring the control section 150 are configured by, for example, the main processor 140, the memory 118, and the nonvolatile storing section 121.

The control section 150 executes various kinds of processing using data stored by the storing section 122 and controls the HMD 100.

The storing section 122 stores various data processed by the control section 150. The storing section 122 stores setting data 123, content data 124, and normal range information 125. The setting data 123 includes various setting values related to the operation of the HMD 100. When the control section 150 uses parameters, a determinant, an arithmetic expression, an LUT (Look UP Table), and the like when controlling the HMD 100, the parameters, the determinant, the arithmetic expression, the LUT (Look UP Table), and the like may be included in the setting data 123.

The content data 124 is data of contents including an image and a video displayed by the image display section 20 according to the control by the control section 150. The content data 124 includes image data or video data. The content data 124 may include sound data. Further, the content data 124 may include image data of a plurality of images. In this case, the plurality of images are not limited to images simultaneously displayed on the image display section 20.

When contents are displayed by the image display section 20, the content data 124 may be contents of a bidirectional type for which operation of the user is received by the control device 10 and the control section 150 executes processing corresponding to the received operation. In this case, the content data 124 may include image data of a menu screen displayed when operation is received and data for deciding processing and the like corresponding to items included in the menu screen.

The normal range information 125 is information indicating a range in which a worn state of the image display section 20 is in a normal range. In this embodiment, the normal range is a range in which the user wearing the image display section 20 can visually recognize an entire image displayed by the image display section 20. The normal range information 125 is information indicating a range on the captured image data 300 of the inner cameras 68. Details of the normal range information 125 are explained below.

The control section 150 has functions of the OS 143, an image processing section 145, a display control section 147, the imaging control section 149, and a worn-state determining section 151. The worn-state determining section 151 is equivalent to the "control section" according to the invention.

The function of the OS 143 is a function of the control program stored by the storing section 122. The other sections of the control section 150 are functions of application programs executed on the OS 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like.

The image processing section 145 may perform, according to necessity, resolution conversion processing for converting resolution of the image data into resolution suitable for the right display unit 22 and the left display unit 24. The image processing section 145 may execute image adjustment processing for adjusting luminance and chroma of the image data, 2D/3D conversion processing for creating 2D image data from 3D image data or creating 3D image data from 2D image data, and the like. When the image processing section 145 executes these kinds of image processing, the image processing section 145 generates a signal for displaying an image on the basis of the image data after the processing and transmits the signal to the image display section 20 via the connection cable 40.

Besides being realized by the main processor 140 executing a computer program, the image processing section 145 may be configured by hardware (e.g., a DSP (Digital Signal Processor)) different from the main processor 140.

The display control section 147 generates a control signal for controlling the right display unit 22 and the left display unit 24 and controls, with the control signal, generation and emission of image lights by the right display unit 22 and the left display unit 24. Specifically, the display control section 147 controls the OLED driving circuits 225 and 245 to execute display of an image by the OLED panels 223 and 243. The display control section 147 performs, on the basis of a signal output by the image processing section 145, control of timing when the OLED driving circuits 225 and 245 perform drawing on the OLED panels 223 and 243, control of luminance of the OLED panels 223 and 243, and the like.

The imaging control section 149 controls the camera 61 and the inner cameras 68 to execute imaging and causes the cameras 61 and 68 to generate the captured image data 300. The imaging control section 149 causes the storing section 122 to temporarily store the captured image data 300 acquired from the camera 61 and the inner cameras 68. When the camera 61 or the inner cameras 68 are configured as a camera unit including a circuit that generates the captured image data 300, the imaging control section 149 acquires the captured image data 300 from the camera 61 and causes the storing section 122 to temporarily store the captured image data 300.

The worn-state determining section 151 determines a worn state of the image display section 20 on the head of the user.

The worn-state determining section 151 starts the determination of the worn state when a signal serving as a trigger for starting the determination is input or when a state serving as a trigger is detected. In the following explanation, the input of the signal serving as the trigger and the detection of the state serving as the trigger are collectively referred to as start state. The start state includes, for example, a state in which a signal indicating that contact is detected is input to the worn-state determining section 151 from either one of the piezoelectric sensors 217 and 239. That is, when the image display section 20 is worn on the head of the user and the ear of the user comes into contact with either one of the piezoelectric sensors 217 and 239, the piezoelectric sensor 217 or 239 outputs, to the worn-state determining section 151, a signal indicating that the contact is detected. When the signal indicating that the contact is detected is input from either one of the piezoelectric sensors 217 and 239, the worn-state determining section 151 determines that the start state is detected and starts the determination of the worn state.

In the explanation in this embodiment, the piezoelectric sensor 217 is provided in the right holding section 21 and the piezoelectric sensor 239 is provided in the left holding section 23. However, piezoelectric sensors may be provided in, for example, left and right nose pad sections. When the nose of the user comes into contact with the nose pad sections, the piezoelectric sensors provided in the nose pad sections output, to the control section 150, signals indicating that the contact is detected.

The start state includes a state in which the worn-state determining section 151 determines that a change occurs in a detection value input from the six-axis sensor 235.

Values of three-axis acceleration and three-axis angular velocity detected by the six-axis sensor 235 change when the user holds the image display section 20. The six-axis sensor 235 outputs a signal indicating the detected values of the three-axis acceleration and the three-axis angular velocity to the worn-state determining section 151. When determining that a change occurs in the input signal indicating the values of the three-axis acceleration and the three-axis angular velocity, the worn-state determining section 151 determines that the start state is detected and starts the determination of the worn state.

The start state includes a state in which the worn-state determining section 151 detects an image of the eyes from the captured image data 300 of the inner cameras 68. The inner cameras 68 are a pair of cameras that respectively images the right eye RE and the left eye LE of the user wearing the image display section 20. When the image display section 20 is worn on the head of the user, the eyes of the user are reflected on the captured image data 300 of the inner cameras 68. The worn-state determining section 151 reads out the captured image data 300 captured by the inner cameras 68 and stored in the storing section 122 and detects an image of the eyes from the read-out captured image data 300. The worn-state determining section 151 determines that the start state is detected when the image of the eyes is detected from the captured image data 300 and starts the determination of the worn state.

When the start state is detected, the worn-state determining section 151 determines whether the image display section 20 is properly worn on the head of the user. In the following explanation, this determination is referred to as wearing determination. The wearing determination can be performed on the basis of, for example, the position of the image of the eyes of the user detected from the captured image data 300 of the inner cameras 68.

For example, when calibration is performed in advance and the image display section 20 is properly worn on the head of the user, the worn-state determining section 151 registers, as a normal position, the position of the image of the eyes of the user detected from the captured image data 300 of the inner cameras 68. More specifically, the worn-state determining section 151 causes the image display section 20 to display the image and causes the user to adjust the worn position of the image display section 20. The user adjusts a worn position of the image display section 20 and, for example, presses the button 11 of the operation section 110 in the worn position where the entire image displayed by the image display section 20 can be visually recognized.

Figure 7:
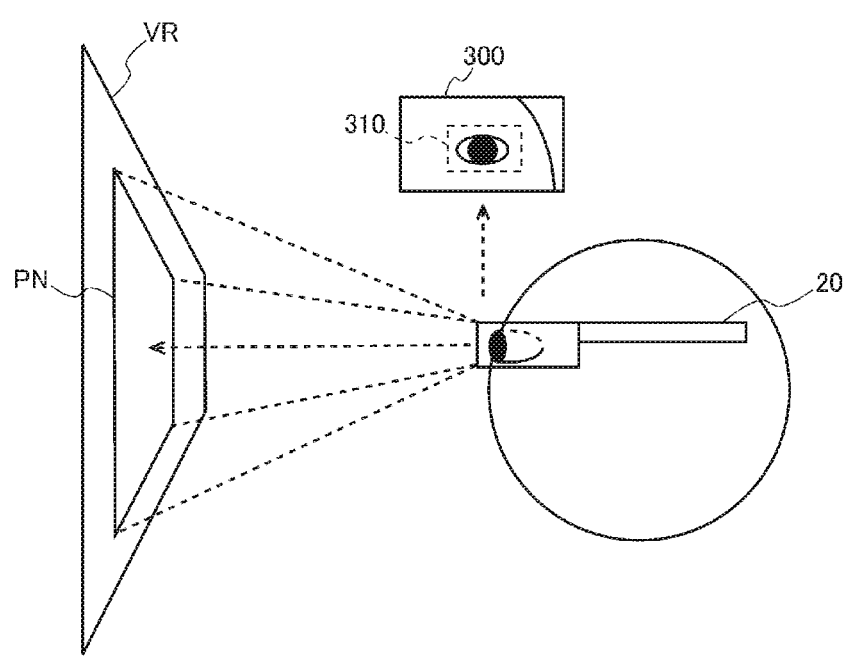
FIG. 7 is a diagram showing a state in which the image display section is worn in a proper position of the head of the user.

FIG. 7 shows a state in which the image display section 20 is worn in a proper position of the head of the user. In FIG. 7, the captured image data 300 of the inner cameras 68 at the time when the image display section 20 is worn in the proper position of the head of the user is shown.

When receiving pressing operation of the button 11, the worn-state determining section 151 causes the inner cameras 68 to execute imaging. The worn-state determining section 151 detects an image of the eyes of the user from the captured image data 300 of the inner cameras 68 and specifies a range of the captured image data 300 in which the image of the eyes is captured. The worn-state determining section 151 causes the storing section 122 store, as the normal range information 125, a range including the specified range of the captured image data 300 and obtained by expanding the specified range upward and downward and to the left and the right by preset values. In FIG. 7, the captured image data 300 at the time when the image display section 20 is worn in the proper position of the head of the user and a normal range 310 on the captured image data 300 based on the normal range information 125 are shown.

In FIG. 7, a field of view range VR of the user wearing the image display section 20 and a display region PN in the field of view range VR are shown. The display region PN indicates a range in which the image display section 20 can display an image.

The worn-state determining section 151 lights or flashes the LED indicator 12 when deviation of the worn state of the image display section 20 is larger than a preset range. The worn-state determining section 151 may output, with the speaker 17, sound indicating that the worn state of the image display section 20 is abnormal or may vibrate the vibrator 19.

When the deviation of the worn state of the image display section 20 is larger than the preset range, it is likely that the right electronic shade 227 and the left electronic shade 247 are invisible to the user. In such a case, notification by the lighting or the flashing of the LED indicator 12, the sound output by the speaker 17, the vibration of the vibrator 19, or the like is performed according to the control by the worn-state determining section 151. With such notifying operation, it is possible to cause the user to recognize that the sworn state of the image display section 20 greatly deviates. The worn-state determining section 151 may perform the lighting or the flashing of the LED indicator 12, the sound output by the speaker 17, the vibration of the vibrator 19, or the like when the worn state of the image display section 20 is changed by the user and it is determined that the deviation of the worn state decreases.

In this embodiment, when the image of the eyes of the user can be detected from the captured image data 300 of the inner cameras 68, the worn-state determining section 151 determines that the deviation of the worn state of the image display section 20 is within the preset range. When the image of the eyes of the user cannot be detected from the captured image data 300 of the inner cameras 68, the worn-state determining section 151 determines that the deviation of the worn state of the image display section 20 is larger than the preset range.

The worn-state determining section 151 may determine on the basis of signals input from the piezoelectric sensors 217 and 239 whether the image display section 20 is worn in the proper position of the head of the user.

For example, the piezoelectric sensors 217 and 239 are provided in the left and right nose pad sections besides the right holding section 21 and the left holding section 23. When signals indicating that contact is detected are input from all of the piezoelectric sensors 217 and 239 provided in the right holding section 21 and the left holding section 23 and the left and right nose pad sections, the worn-state determining section 151 determines that the worn state of the image display section 20 is correct. When a value of pressure indicated by the signals input from the piezoelectric sensors 217 and 239 provided in the right holding section 21 and the left holding section 23 and the left and right nose pad section is in a normal range, the worn-state determining section 151 may determine that the worn state of the image display section 20 is correct. The normal range of the value of the pressure is a value of pressure measured by the piezoelectric sensors 217 and 239 when the calibration is performed.

When determining the worn state of the image display section 20, the worn-state determining section 151 guides adjustment of the worn state of the image display section 20 on the basis of a result of the determination. The worn-state determining section 151 adjusts the transmittance of the external light by the right electronic shade 227 and the left electronic shade 247 targeting a range not overlapping the image displayed by the image display section 20 and guides the user about adjustment of the worn state of the image display section 20.

Figure 8:
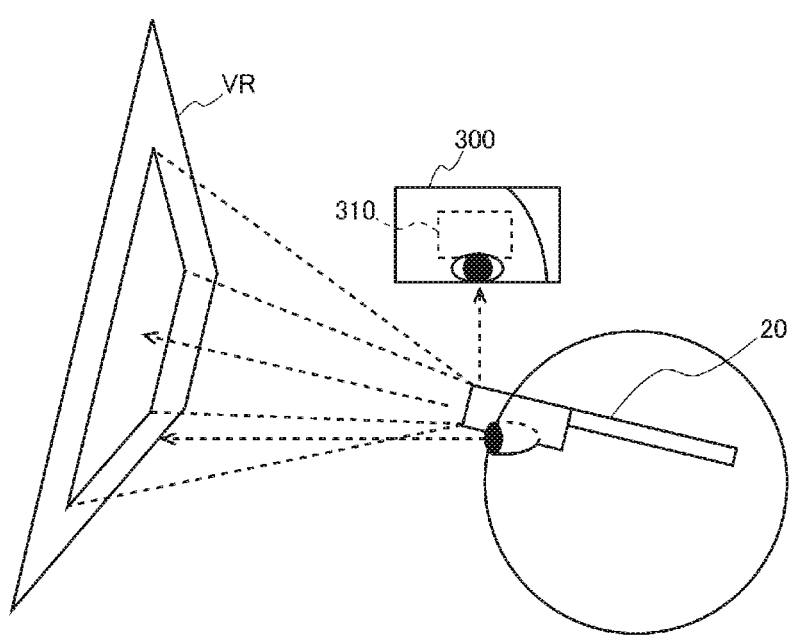
FIG. 8 is a diagram showing a state in which the user wears the image display section in a deviating state.

FIG. 8 is a diagram showing a state in which the user wears the image display section 20 in a deviating state. In particular, FIG. 8 shows a state in which the image display section 20 is worn while deviating upward from the normal range 310 indicated by the normal range information 125. In FIG. 8, the captured image data 300 of the inner cameras 68 captured in the upward deviating state of the image display section 20 is shown.

When determining that the image display section 20 is not worn in the proper position of the head of the user, the worn-state determining section 151 determines a direction in which the worn position of the image display section 20 deviates. The worn-state determining section 151 compares the position of the image of the eyes of the user detected from the captured image data 300 and the normal range 310 registered as the normal range information 125 in the storing section 122.

When the position of the image of the eyes of the user detected from the captured image data 300 is above the normal range 310 registered as the normal range information 125, the worn-state determining section 151 determines that the worn position of the image display section 20 deviates downward from the normal range.

When the position of the image of the eyes of the user detected from the captured image data 300 is below the normal range 310 registered as the normal range information 125, the worn-state determining section 151 determines that the worn position of the image display section 20 deviates upward from the normal range.

When the position of the image of the eyes of the user detected from the captured image data 300 is on the left side of the normal range 310 registered as the normal range information 125, the worn-state determining section 151 determines that the worn position of the image display section 20 deviates to the right side from the normal range.

When the position of the image of the eyes of the user detected from the captured image data 300 is on the right side of the normal range 310 registered as the normal range information 125, the worn-state determining section 151 determines that the worn position of the image display section 20 deviates to the left side from the normal range.

When determining the direction in which the worn position deviates, the worn-state determining section 151 selects, according to the determined deviating direction, preset regions of the right electronic shade 227 and the left electronic shade 247. The worn-state determining section 151 adjusts the transmittance of the external light in the selected regions. More specifically, the worn-state determining section 151 reduces the transmittance of the external light in regions of the right electronic shade 227 and the left electronic shade 247, which are peripheral regions not overlapping the half mirrors 261 and 281.

Figure 9:
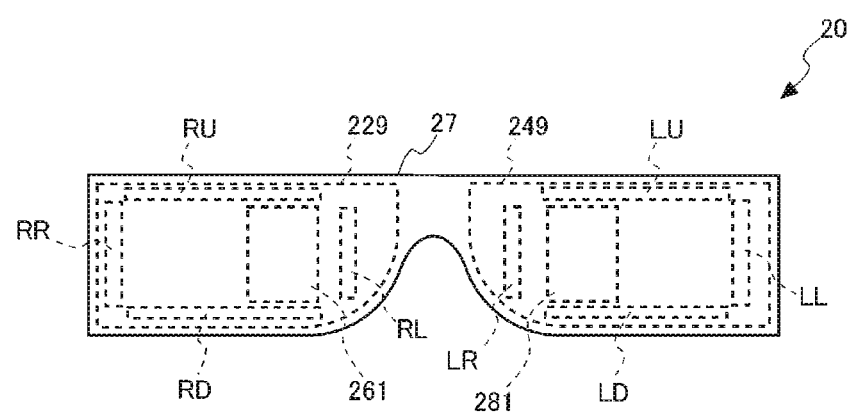
FIG. 9 is a diagram showing the image display section viewed from the opposite side of the side of the head of the user.

FIG. 9 is a diagram showing a main part configuration of the image display section 20 viewed from the opposite side of the side of the head of the user. In particular, FIG. 9 shows adjustment regions provided in the liquid crystal panel 229 of the right electronic shade 227 and the liquid crystal panel 249 of the left electronic shade 247.

The adjustment regions are regions used to indicate a direction in which the worn position of the image display section 20 deviates and are regions formed by dividing regions of the liquid crystal panels 229 and 249 into pluralities of regions. The worn-state determining section 151 is capable of setting the transmittance of the external light (visible light) in the plurality of adjustment regions.

The adjustment regions are regions corresponding to the periphery of the display region PN. The display region PN corresponds to regions where the half mirrors 261 and 281 are disposed shown in FIG. 9. The half mirrors 261 and 281 are members that reflect the image light L emitted from the OLED panel 223 and make the image light L incident on the right eye RE and the left eye LE. Therefore, the regions where the half mirrors 261 and 281 are disposed correspond to the display region PN where the image display section 20 displays an image.

The right electronic shade 227 includes, as the adjustment regions, four regions, that is, an upper region RU (Right UP), a lower region RD (Right Down), a left region RL (Right Left), and a right region RR (Right Right) shown in FIG. 9. The left electronic shade 247 includes, as the adjustment regions, four regions, that is, an upper region LU (Left UP), a lower region LD (Left Down), a left region LL (Left Left), and a right region LR (Left Right) shown in FIG. 9.

Figure 10:
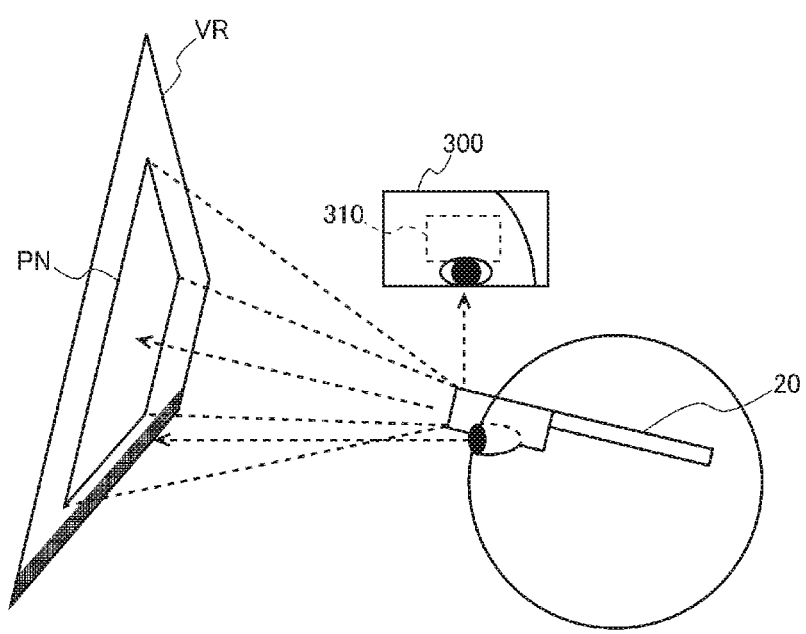
FIG. 10 is a diagram showing a state in which the user wears the image display section in a deviating state.

FIG. 10 is a diagram showing a state in which the user wears the image display section 20 in a deviating state. In particular, FIG. 10 shows a state in which the image display section 20 is worn while deviating upward from the normal range 310 indicated by the normal range information 125.

For example, when determining that the worn position of the image display section 20 deviates upward from the normal range 310, the worn-state determining section 151 reduces the transmittance of the external light in the lower region RD and the lower region LD among the adjustment regions of the right electronic shade 227 and the left electronic shade 247 (see FIG. 10). When the transmittance of the external light is reduced by the right electronic shade 227 and the left electronic shade 247, visibility of an image in a region of the image display section 20 corresponding to a direction in which the transmittance is reduced increases. That is, when the transmittance of the external light in the lower region RD and the lower region LD of the right electronic shade 227 and the left electronic shade 247 is reduced, an image displayed in a lower region in the display region PN of the image display section 20 is easily seen. For this reason, in order to make the image easily seen, the user performs adjustment for moving the worn position of the image display section 20 in the downward direction. Therefore, it is possible to urge the user to move the worn position of the image display section 20 in the downward direction.

When determining that the worn position of the image display section 20 deviates downward from the normal range 310, the worn-state determining section 151 reduces the transmittance of the external light in the upper region RU and the upper region LU among the adjustment regions of the right electronic shade 227 and the left electronic shade 247.

When determining that the worn position of the image display section 20 deviates to the left side from the normal range 310, the worn-state determining section 151 reduces the transmittance of the external light in the right region RR and the right region LR among the adjustment regions of the right electronic shade 227 and the left electronic shade 247.

When determining that the worn position of the image display section 20 deviates to the right side from the normal range 310, the worn-state determining section 151 reduces the transmittance of external light in the left region RL and the left region LL among the adjustment regions of the right electronic shade 227 and the left electronic shade 247.

Figure 11:
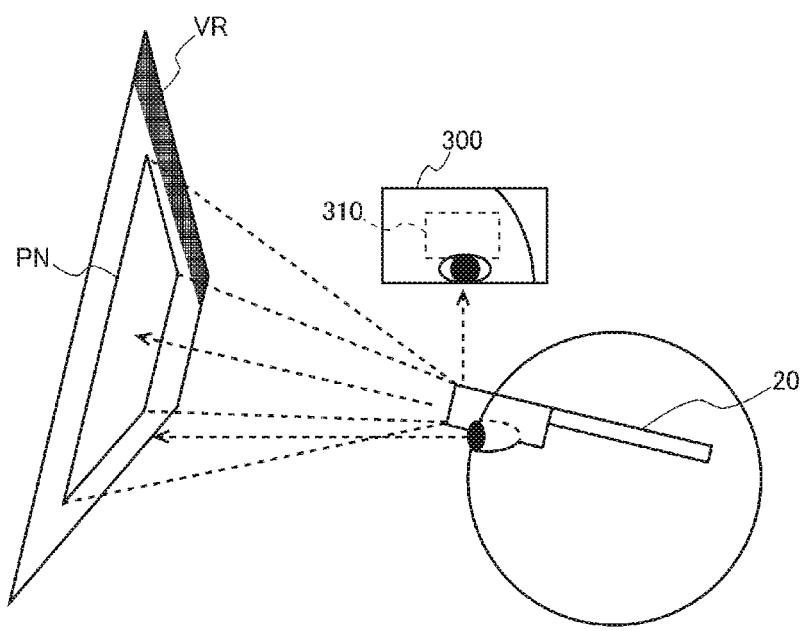
FIG. 11 is a diagram showing a state in which the user wears the image display section in a deviating state.

FIG. 11 is a diagram showing a state in which the user wears the image display section 20 in a deviating state. In particular, FIG. 11 shows a state in which the image display section 20 is worn while deviating upward from the normal range 310 indicated by the normal range information 125.

When determining that the worn position of the image display section 20 deviates, the worn-state determining section 151 may reduce the transmittance of the external light in the adjustment regions of the right electronic shade 227 and the left electronic shade 247 in a direction in which the worn position deviates.

For example, when determining that the worn position of the image display section 20 deviates upward from the normal range 310, the worn-state determining section 151 reduces the transmittance of the external light in the upper region RU and the upper region LU among the adjustment regions of the right electronic shade 227 and the left electronic shade 247 (see FIG. 11). That is, the worn-state determining section 151 indicates a deviating direction of the worn state of the image display section 20 by reducing brightness of the adjustment regions of the right electronic shade 227 and the left electronic shade 247 corresponding to the deviating direction of the worn state. The user can adjust the deviation of the worn state of the image display section 20 by adjusting the worn position of the image display section 20 in a direction in which the brightness of the display region RN decreases.

When determining that the worn position of the image display section 20 deviates downward from the normal range 310, the worn-state determining section 151 reduces the transmittance of the external light in the lower region RD and the lower region LD among the adjustment regions of the right electronic shade 227 and the left electronic shade 247.

When determining that the worn position of the image display section 20 deviates to the left side from the normal range 310, the worn-state determining section 151 reduces the transmittance of the external light in the left region RL and the left region LR among the adjustment regions of the right electronic shade 227 and the left electronic shade 247.

When determining that the worn position of the image display section 20 deviates to the right side from the normal range 310, the worn-state determining section 151 reduces the transmittance of the external light in the right region RR and the right region LR among the adjustment regions of the right electronic shade 227 and the left electronic shade 247.

In the above explanation in the embodiment, the adjustment regions are provided in the directions corresponding to the four upward, downward, left, and right directions of the liquid crystal panels 229 and 249. However, directions in which the adjustment regions are provided are not limited to the four directions. For example, the adjustment regions may be provided in eight directions including the four upward, downward, left, and right directions and upper right, lower right, upper left, and lower left directions of the liquid crystal panels 229 and 249. In FIG. 9, the square adjustment regions are shown. However, the shape of the adjustment regions is not limited to the square. The shape of the adjustment regions may be, for example, a circle or a polygon.

In the above explanation, it is determined whether the worn state deviates according to whether the position of the image of the eyes of the user detected from the captured image data 300 is within the normal range 310 registered as the normal range information 125. Further, rather than determining only whether the worn state of the image display section 20 deviates, when it is determined that the worn state of the image display section 20 deviates, a degree of the deviation may be determined.

For example, the control section 150 determines three states, that is, (1) a proper worn state, (2) the worn state is not proper but the display region PN can be visually recognized, and (3) the worn state is not proper and the display region PN cannot be visually recognized. The determination of these states is performed, for example, on the basis of the position of the image of the eyes of the user detected from the captured image data 300 and the distance from the normal range 310.

When the image of the eyes of the user detected from the captured image data 300 is within the normal range 310, the control section 150 determines that the worn state is proper. When the image of the eyes of the user detected from the captured image data 300 is not within the normal range 310 but the image of the eyes of the user can be detected by the captured image data 300, the control section 150 determines that the worn state is not proper but the display region PN can be visually recognized. When image of the eyes of the user cannot be detected from the captured image data 300, the control section 150 determines that the worn state is not proper and the display region PN cannot be visually recognized.

When determining that the worn state of the image display section 20 is the state of (1), the control section 150 does not perform control for reducing the transmittance of the external light in the right electronic shade 227 and the left electronic shade 247 and displaying character information. The control section 150 may cause the image display section 20 to display, in the display region PN, indication that the image display section 20 is worn in the proper position.

When determining that the worn state of the image display section 20 is the state of (2), the control section 150 adjusts the transmittance of the external light in the right electronic shade 227 and the left electronic shade 247 and further causes the image display section 20 to display, in the display region PN, a message indicating that the worn state is not correct.

When determining that the worn state of the image display section 20 is the state of (3), the control section 150 adjusts the transmittance of the external light in the right electronic shade 227 and the left electronic shade 247 and notifies the user that the worn state of the image display section 20 is not proper.

Figure 12:
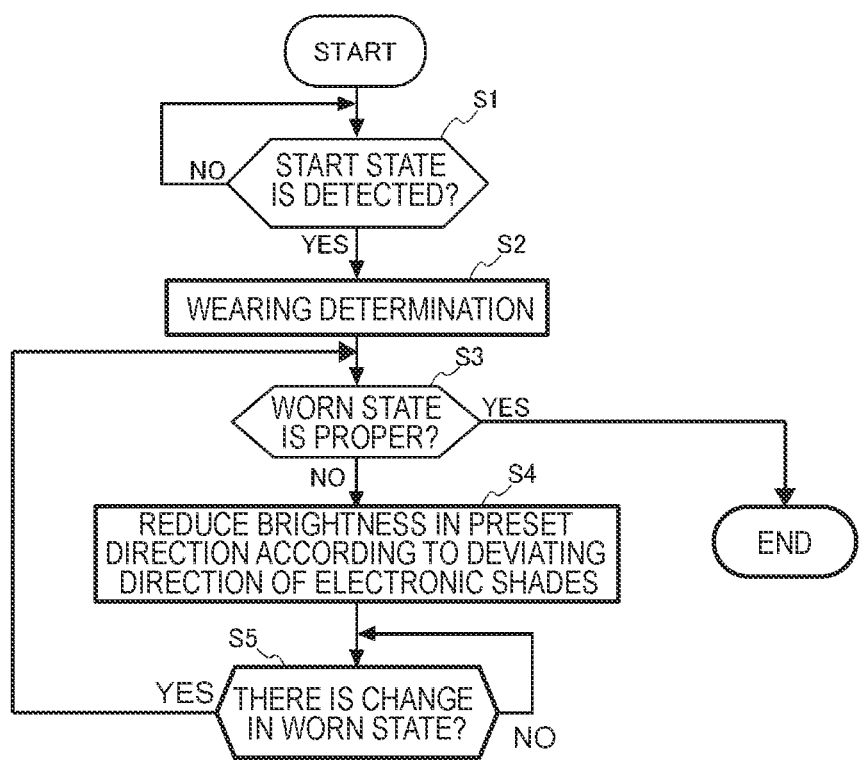
FIG. 12 is a flowchart for explaining the operation of the control section.

FIG. 12 is a flowchart for explaining the operation of the control section 150.

First, the control section 150 determines whether the start state is detected (step S1). When the start state is not detected (NO in step S1), the control section 150 does not start processing until the start state is detected.

When the start state is detected (YES in step S1), the control section 150 starts the wearing determination (step S2). The control section 150 detects an image of the eyes of the user from the captured image data 300 of the inner cameras 68 and specifies a range of the captured image data 300 in which the image of the eyes is detected. The control section 150 compares the specified range of the captured image data 300 and the normal range 310 registered as the normal range information 125 in the storing section 122 and determines whether the worn state of the image display section 20 is proper (step S3). When the specified range of the captured image data 300 is included in the normal range 310 registered as the normal range information 125, the control section 150 determines that the worn state of the image display section 20 is proper (YES in step S3). When determining that the worn state of the image display section 20 is proper, the control section 150 ends this processing flow.

When the specified range of the captured image data 300 is not included in the normal range 310 registered as the normal range information 125, the control section 150 determines that the worn state of the image display section 20 is not proper (NO in step S3). When the image of the eyes is not detected from the captured image data 300, the control section 150 also determines that the worn state of the image display section 20 is not proper (NO in step S3).

When determining that the worn state of the image display section 20 is not proper (NO in step S3), the control section 150 specifies a direction in which the worn position of the image display section 20 deviates.

The control section 150 determines a direction in which the range of the captured image data 300 in which the image of the eyes is detected deviates from the normal range 310 registered as the normal range information 125 and specifies a direction in which the worn position of the image display section 20 deviates. When specifying the deviating direction, the control section 150 reduces, according to the specified deviating direction, the transmittance of the external light in the preset regions of the right electronic shade 227 and the left electronic shade 247 (step S4). Subsequently, the control section 150 determines according to the captured image data 300 of the inner cameras 68 whether there is a change in the worn state of the image display section 20 (step S5). The control section 150 determines whether there is a change in the positions of the eyes detected from the captured image data 300 and determines whether there is a change in the worn state of the image display section 20. When there is no change in the worn state of the image display section 20 (NO in step S5), the control section 150 stays on standby until a change is detected in the worn state. When a change is detected in the worn state of the image display section 20 (YES in step S5), the control section 150 shifts to the processing in step S3 and determines whether the worn state of the image display section 20 is proper (step S3). Thereafter, the control section 150 repeats the processing in steps S3 to S5 until it is determined that the worn state of the image display section 20 is proper.

As explained above, in this embodiment, the HMD 100 includes the image display section 20, the right electronic shade 227 and the left electronic shade 247, and the control section 150. The right electronic shade 227 and the left electronic shade 247 adjust the transmittance of the external light transmitted through the image display section 20. The control section 150 determines the worn state of the image display section 20 on the head of the user and guides the adjustment of the worn state of the image display section 20 on the basis of a result of the determination. The control section 150 guides the adjustment of the worn state of the image display section 20 by adjusting the transmittance of the external light with the right electronic shade 227 and the left electronic shade 247.

Therefore, it is possible to indicate the worn state of the image display section 20 with the transmittance of the external light. Therefore, it is possible to guide, with the HMD 100, the adjustment of the worn state of the image display section 20.

The image display section 20 includes the display region PN where an image is displayed. The right electronic shade 227 and the left electronic shade 247 include the liquid crystal panels 229 and 249 disposed to be superimposed on the image display section 20 including the display region PN. The control section 150 sets, on the basis of the determination result of the worn state of the image display section 20, regions of the liquid crystal panels 229 and 249 where the transmittance of the external light is adjusted and adjusts the transmittance of the external light in the set regions.

Therefore, it is possible to adjust the transmittance of the external light in the regions of the liquid crystal panels corresponding to the determination result of the worn state of the image display section 20. Therefore, it is possible to show the determination result of the worn state of the image display section 20 to the user.

When determining that the worn state of the image display section 20 on the head of the user deviates, the control section 150 adjusts the transmittance of the regions of the liquid crystal panels corresponding to the regions around the display region PN, that is, the regions corresponding to the direction in which the worn state deviates.

Therefore, it is possible to cause the user to recognize the direction in which the worn state of the image display section 20 deviates.

When determining that the worn state of the image display section 20 on the head of the user deviates, the control section 150 adjusts the transmittance of the regions of the liquid crystal panels corresponding to the regions around the display region PN, that is, the regions corresponding to the direction opposite to the direction in which the worn state deviates.

By adjusting the transmittance of the external light, it is possible to improve visibility of the image displayed by the image display section 20. That is, by adjusting the worn state of the image display section 20 in the direction in which the transmittance of the external light is adjusted, it is possible to improve the visibility of the image displayed by the image display section 20. Therefore, the user can adjust the deviation of the worn state of the image display section 20 by adjusting the worn state of the image display section 20 in the direction in which the visibility of the image displayed by the image display section 20 is improved.

Second Embodiment

The right electronic shade 227 and the left electronic shade 247 include the transmissive liquid crystal panels 229 and 249 on which the plurality of pixels are arranged in a matrix shape. Therefore, the control section 150 is capable of causing the liquid crystal panels 229 and 249 to display characters and images by controlling the shade driving sections 228 and 248 and controlling the right electronic shade 227 and the left electronic shade 247. The characters and the images displayed on the liquid crystal panels 229 and 249 are sometimes invisible for the user wearing the image display section 20. That is, even when information displayed on the liquid crystal panels 229 and 249 is appropriately arranged, since the distance to the eyes of the user from the liquid crystal panels 229 and 249 is short, the characters and the like are sometimes blurred and invisible when being displayed on the liquid crystal panels 229 and 249. In the first place, when characters are displayed outside or in a boundary of the field of view of the user, the characters are sometimes invisible. However, a person on the outside other than the user can visually recognize the characters and the images displayed on the liquid crystal panels 229 and 249. Even the user can visually recognize the characters and the images displayed on the liquid crystal panels 229 and 249 before the user wears the image display section 20.

Therefore, in a second embodiment, the liquid crystal panels 229 and 249 of the right electronic shade 227 and the left electronic shade 247 are effectively utilized to display information to the user before the wearing of the HMD 100 and to a person other than the user after the wearing of the HMD 100. The displayed information includes text data and signs including information concerning the worn state of the image display section 20 and texts and signs including information concerning the operation state of the image display section 20. The information concerning the worn state is information indicating whether the image display section 20 is in the proper worn state. When the image display section 20 is in the proper worn state, the control section 150 causes the image display section 20 to display, in the display region PN, a sign or a message indicating that the worn state of the image display section 20 is proper. When determining that the image display section 20 is not in the proper worn state, the control section 150 causes the image display section 20 to display a sign or a message indicating that the worn state of the image display section 20 is not proper. When the worn state of the image display section 20 is not proper, the control section 150 may cause the image display section 20 to display a sign or a message indicating a direction in which the worn position of the image display section 20 deviates.

The characters and the signs displayed on the liquid crystal panels 229 and 249 of the right electronic shade 227 and the left electronic shade 247 may be link information for displaying information, for example, QR codes (registered trademark) and two-dimensional barcodes. The control section 150 may cause the liquid crystal panels 229 and 249 of the right electronic shade 227 and the left electronic shade 247 to display the characters and the signs in a level that the user or outsiders cannot visually recognize like an electronic watermark. In this case, as in the case of the texts or the signs, it is possible to inform the worn state to the outside. Further, by adding the additional information to the entire regions of the electronic shades (dispersing a change in transmittance of the electronic shades), it is possible to prevent visual recognition of the outside world via the electronic shades from being hindered.

Figure 13:
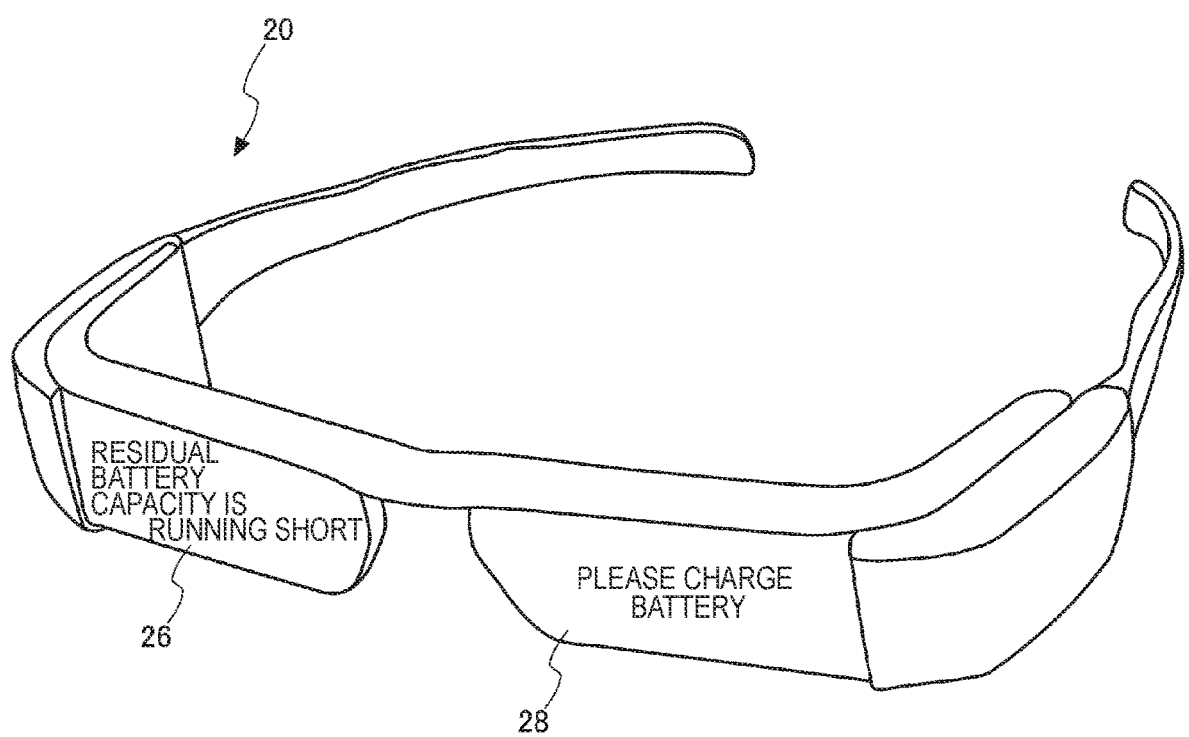
FIG. 13 is a diagram showing display objects displayed on electronic shades.

FIG. 13 is a diagram showing display objects displayed on the electronic shades. In particular, FIG. 13 is a diagram showing a state in which characters are displayed as the display objects on the liquid crystal panels 229 and 249.

For example, in a state before the image display section 20 is worn by the user and when a charging state of the battery 132 of the HMD 100 is lower than a preset threshold, the control section 150 causes the right electronic shade 227 and the left electronic shade 247 to display characters indicating messages. The messages are information concerning the operation state of the image display section 20. For example, as shown in FIG. 13, the messages are a message indicating that a residual battery capacity is running short and a message requesting charging. The messages displayed on the right electronic shade 227 and the left electronic shade 247 are not messages to the user wearing the image display section 20 and are messages to the user before wearing the HMD 100, an administrator of the HMD 100, or the like. Therefore, as shown in FIG. 13, the control section 150 causes the image display section 20 to display the messages on the outer side of the image display section 20, that is, in a direction recognizable from the opposite side of the side of the eyes of the user wearing the image display section 20.

On a pedestal for charging on which the HMD 100 is set and charged, a reflecting section that reflects light on the outside such as a light source or a mirror to the side of the right electronic shade 227 and the left electronic shade 247 set on the pedestal may be provided to enable the message requesting charging displayed on the right electronic shade 227 and the left electronic shade 247 to be visually recognized.

In the state before the image display section 20 is worn on the head of the user, the control section 150 may cause the liquid crystal panels 229 and 249 to display an image having a predetermined color.

For example, when the image display section 20 is the image display section 20 formed in a size for children, the control section 150 causes the liquid crystal panels 229 and 249 to display a red image. When the image display section 20 is the image display section 20 formed in a size for adults, the control section 150 causes the liquid crystal panels 229 and 249 to display a blue image. In this way, in the state before the wearing of the image display section 20, by changing the color of images displayed on the right electronic shade 227 and the left electronic shade 247, it is possible to clearly indicate whether the image display section 20 is the image display section 20 for children or the image display section 20 for adults.

When the HMD 100 is used in, for example, a facility of a museum, the control section 150 may cause the liquid crystal panels 229 and 249 to display information indicating the worn state of the image display section 20. A guide in the facility has the user to wear the image display section 20 and guides the user about adjustment of the worn state of the image display section 20 referring to the information indicating the worn state of the image display section 20 displayed on the liquid crystal panels 229 and 249. In this case, the information indicating the worn state is displayed on the outer side of the image display section 20, that is, in a direction recognizable from the opposite side of the side of the eyes of the user wearing the image display section 20.

When causing the liquid crystal panels 229 and 249 to display the information indicating the worn state of the image display section 20, rather than causing both of the liquid crystal panels 229 and 249 to display the information indicating the worn state, the control section 150 may cause either one of the liquid crystal panels 229 and 249 to display the information indicating the worn state. For example, the control section 150 determines, from captured image data of the camera 61, an imaging region of the guide in the facility and causes the liquid crystal panels 229 and 249 in a direction corresponding to an imaging direction of the guide to display the information indicating the worn state of the image display section 20.

When the control section 150 causes the liquid crystal panels 229 and 249 to display the information indicating the worn state of the image display section 20 in the direction recognizable from the opposite side of the side of the eyes of the user, the user may remove the HMD 100 and confirm messages displayed to the outer side.

The embodiments explained above are preferred implementation modes of the invention. However, the invention is not limited to the embodiments and can be carried out in various forms without departing from the spirit of the invention.

For example, in the embodiments, the control section 150 adjusts the transmittance of the external light with the right electronic shade 227 and the left electronic shade 247 and guides the adjustment of the worn state of the image display section 20. As another method of guiding the adjustment of the worn state, the control section 150 may cause the image display section 20 to display the determination result of the worn state of the image display section 20 in the display region of the image display section 20.

That is, when the worn position of the image display section 20 deviates, the control section 150 adjusts brightness of the peripheral portion of the display region PN of the image display section 20 corresponding to the deviating direction.

For example, when determining that the worn position of the image display section 20 deviates upward, the control section 150 reduces or increases brightness of a region on a side close to the upper side among the upper side, the lower side, the left side, and the right side forming the display region PN of the image display section 20.

When determining that the worn position of the image display section 20 deviates downward, the control section 150 reduces or increases brightness of a region on a side close to the lower side among the upper side, the lower side, the left side, and the right side forming the display region PN of the image display section 20.

When determining that the worn position of the image display section 20 deviates to the left side, the control section 150 reduces or increases brightness of a region on a side close to the left side among the upper side, the lower side, the left side, and the right side forming the display region PN of the image display section 20.

When determining that the worn position of the image display section 20 deviates to the right side, the control section 150 reduces or increases brightness of a region on a side close to the right side among the upper side, the lower side, the left side, and the right side forming the display region PN of the image display section 20.

In the embodiments, the determination of the worn state is performed in the HMD 100 alone. However, information or information indicating the determination result of the worn state may be acquired from an external apparatus. The direction in which the worn state of the image display section 20 deviates may be displayed by the right electronic shade 227 and the left electronic shade 247. For example, the HMD 100 is connected to a server apparatus to which a captured image of a fixed-point camera is input. The user wears the image display section 20 and performs imaging using the fixed-point camera. The server apparatus receives an input of a captured image of the fixed-point camera, determines the worn state of the image display section 20 on the head of the user, and transmits information indicating a result of the determination to the HMD 100.

A worn state of the HMD 100 may be determined by another HMD 100. For example, when a first user wears the image display section 20 of the HMD 100 on the head, the first user is imaged by the camera 61 of the HMD 100 worn by a second user. The HMD 100 of the second user determines the worn state of the image display section 20 of the first user from captured image data of the camera 61 and transmits a result of the determination to the HMD 100 of the first user. The HMD 100 of the second user may directly transmit the captured image data of the first user to the HMD 100 of the first user without performing the determination of the worn state. The HMD 100 of the first user determines the worn state of the image display section 20 on the basis of the captured image data received from the HMD 100 of the second user.

In the embodiments, the configuration is illustrated in which the control device 10 is connected to the image display section 20 by wire. However, the invention is not limited to this. The image display section 20 may be wirelessly connected to the control device 10. As a wireless communication system in this case, the system illustrated as the communication system to which the communication section 117 is adapted may be adopted or other communication systems may be adopted.

A part of the functions included in the control device 10 may be provided in the image display section 20. The control device 10 may be realized by a plurality of devices. For example, a wearable device attachable to the body of the user, clothes, or an ornament worn by the user may be used instead of the control device 10. The wearable device in this case may be, for example, a watch-type device, a finger ring-type device, a laser pointer, a mouse, an air mouse, a game controller, or a pen-type device.

Further, in the embodiments, the configuration in which the image display section 20 and the control device 10 are separated and connected via the connection cable 40 is explained as the example. The invention is not limited to this. A configuration is also possible in which the control device 10 and the image display section 20 are integrally configured and worn on the head of the user.

In the embodiments, the configuration in which the user visually recognizes the outside scene through the display section is not limited to the configuration in which the right light guide plate 26 and the left light guide plate 28 transmit external light. For example, the invention is also applicable to a display device that displays an image in a state in which the outside scene cannot be visually recognized. Specifically, the invention can be applied to a display device that displays a captured image of the camera 61, an image and a CG generated on the basis of the captured image, a video based on video data stored in advance and video data input from the outside, and the like. The display device of this type can include a display device of a so-called closed type with which the outside scene cannot be visually recognized. For example, if a configuration is adopted in which a combined image obtained by combining an image of an outside scene imaged by the camera 61 and a displayed image is displayed by the image display section 20, even if the image display section 20 does not transmit the external light, it is possible to visually recognizably display the outside scene and the image to the user. The invention can be naturally applied to such a display device of a so-called video see-through type.

The invention can also be applied to a display device that does not perform processing such as AR display, MR (Mixed Reality) display, and VR (Virtual Reality) display. The AR display is display for displaying an image to be superimposed on the real space and is display for combining and displaying a captured image in the real space and a virtual image. The VR display is display for displaying the virtual image. For example, a display device that displays video data or an analog video signal input from the outside is naturally included as an application target of the invention.

For example, instead of the image display section 20, an image display section of another system such as an image display system worn like a cap may be adopted. The image display section only has to include a display section that displays an image corresponding to the left eye LE of the user and a display section that displays an image corresponding to the right eye RE of the user. The display device according to the invention may be configured as a head mounted display mounted on a vehicle such as an automobile or a plane. For example, the display device may be configured as a head mounted display incorporated in a body protector such as a helmet. In this case, a portion for positioning a position with respect to the body of a user and a portion positioned with respect to the portion can be set as wearing sections.

In the embodiment, the configuration in which a virtual image is formed by the half mirrors 261 and 281 in a part of the right light guide plate 26 and the left light guide plate 28 is illustrated as the optical system that guides image light to the eyes of the user. The invention is not limited to this. A configuration may be adopted in which an image is displayed in a display region having an area occupying the entire or most of the right light guide plate 26 and the left light guide plate 28. In this case, processing for reducing the image may be included in operation for changing a display position of the image.

Further, the optical elements according to the invention are not limited to the right light guide plate 26 and the left light guide plate 28 including the half mirrors 261 and 281 and only have to be optical components that make image light incident on the eyes of the user. Specifically, a diffraction grating, a prism, and a holography display section may be used.

In the explanation in the embodiments, as the right electronic shade 227 and the left electronic shade 247, normally-black liquid crystal is used in which the transmittance of the external light is 100% in a state without a supplied voltage and the transmittance of the external light is 0% (the external light is blocked) in a state in which the supplied voltage is the maximum. As another example of the liquid crystal used in the right electronic shade 227 and the left electronic shade 247, normally-white liquid crystal may be used in which the transmittance of the external light is 0% in the state without the supplied voltage and the transmittance of the external light is 100% in the state in which the supplied voltage is the maximum.

Instead of the piezoelectric sensor 217, a pressing-type switch or an infrared-ray emitting section and a light receiving section may be provided. In the case of a configuration in which the infrared-ray emitting section and the light receiving section are provided, a contact state in the temple is detected on the basis of a distance until an emitted infrared ray is received.

At least a part of the functional blocks shown in FIGS. 5, 6, and the like may be realized by hardware or may be realized by cooperation of hardware and software and are not limited to the configuration in which the independent hardware resources are disposed as shown in the figures. The computer programs to be executed by the control section 150 may be stored in the nonvolatile storing section 121 or other storage devices (not shown in the figure) in the control device 10. The control section 150 may acquire computer programs stored in an external device via the communication section 117 and the external connector 184 and execute the computer programs. Among the components formed in the control device 10, the operation section 110 may be formed as a user interface (UI). The components formed in the control device 10 may be redundantly formed in the image display section 20. For example, a processor similar to the main processor 140 may be disposed in the image display section 20. The main processor 140 included in the control device 10 and the processor of the image display section 20 may execute separately divided functions.

The entire disclosure of Japanese Patent Application No. 2017-035982, filed Feb. 28, 2017 is expressly incorporated by reference herein.

What is claimed is:

1. A head-mounted display device for use with a user, the head-mounted display comprising:
   a display worn on a head of the user and configured to be capable of transmitting external light and displaying an image in a display region of the display;
   a transmittance adjustment plate configured to adjust transmittance of the external light transmitted through the display, the transmittance adjustment plate being superimposed and disposed on the display including the display region, the transmittance adjustment plate being divided into a plurality of regions, that correspond to a periphery of the display region of the display, in which transmittance of visible light is set for each of the regions; and
   a processor configured to:
      determine a worn state of the display section on the head of the user,
      control the transmittance adjustment plate on the basis of a result of the determination,
      adjust the transmittance of the external light transmitted through the display section,
      set a region of the transmittance adjustment plate for adjusting the transmittance of the external light and adjusting the transmittance of the external light in the set region, and
      determine a deviating direction of a worn position of the display on the head of a user and adjusting transmittance of a region of the transmittance adjustment plate that is outside the display region, corresponding to a direction opposite to the determined deviating direction, to indicate a direction in which the worn state of the display section on the head of the user deviates and guiding the user in adjusting the display.

2. The head-mounted display device according to claim 1, wherein
   the processor displays a display object on the transmittance adjustment plate by setting transmittances of the visible light in the plurality of regions of the transmittance adjustment plate, and
   the display object is displayed in a direction in which the display object can is recognized from an outer side of the display.

3. The head-mounted display device according to claim 1, wherein the display object includes information concerning the worn state of the display.

4. The head-mounted display device according to claim 1, wherein the display object includes information concerning an operation state of the head-mounted display device.

5. The head-mounted display device according to claim 1, wherein the processor is further configured to:
   adjust the transmittance of the external light with the transmittance adjustment plate when a deviation amount of the worn state of the display on the head of the user is within a preset range, and
   notify the user when the deviation amount of the worn state of the display on the head of the user is larger than the preset range.

6. A non-transitory computer readable medium storing a computer program that is executable by a computer mounted on a head-mounted display device, the head-mounted display device including: (i) a display worn on a head of a user and configured to be capable of transmitting external light and displaying an image in a display region included in the display, and (ii) a transmittance adjustment plate that is divided into a plurality of regions, that correspond to a periphery of the display region of the display, and has a transmittance of visible light set for each of the regions, the transmittance adjustment plate being superimposed and disposed on the display including the display region and being configured to adjust transmittance of the external light transmitted through the display, the computer program causing the computer to execute steps comprising:
   determining a worn state of the display on the head of the user; and
   controlling the transmittance adjustment plate based on the determined worn state and adjusting the transmittance of the external light transmitted through the display;
   setting a region of the transmittance adjustment plate for adjusting the transmittance of the external light and adjusting the transmittance of the external light in the set region; and
   determining a deviating direction of a worn position of the display on the head of a user and adjusting transmittance of a region of the transmittance adjustment plate that is outside the display region, corresponding to a direction opposite to the determined deviating direction, to indicate a direction in which the worn state of the display on the head of the user deviates and guiding the user in adjusting the display.

7. A control method for a head-mounted display device, the head-mounted display device including: (i) a display worn on a head of a user and configured to be capable of transmitting external light and displaying an image in a display region included in the display, and (ii) a transmittance adjustment plate that is divided into a plurality of regions, that correspond to a periphery of the display region of the display, and having a transmittance of visible light set for each of the regions, the transmittance adjusting section being superimposed and disposed on the display including the display region and being configured to adjust transmittance of the external light transmitted through the display, the control method comprising:
   determining a worn state of the display on the head of the user;
   controlling the transmittance adjustment plate based on the determined worn state and adjusting the transmittance of the external light transmitted through the display;
   setting a region of the transmittance adjustment plate for adjusting the transmittance of the external light and adjusting the transmittance of the external light in the set region; and
   determining a deviating direction of a worn position of the display on the head of a user and adjusting transmittance of a region of the transmittance adjustment plate that is outside the display region, corresponding to a direction opposite to the determined deviating direction, to indicate a direction in which the worn state of the display section on the head of the user deviates and guiding the user in adjusting the display.

* * * * *